US007696711B2

(12) United States Patent
Pollack et al.

(10) Patent No.: US 7,696,711 B2
(45) Date of Patent: Apr. 13, 2010

(54) DIAPER PAIL

(75) Inventors: Thomas J. Pollack, West Chester, PA (US); Jeffrey Swan, West Chester, PA (US); Brad Studer, West Chester, PA (US)

(73) Assignee: Graco Children's Products Inc., Atlanta, GA (US)

( * ) Notice: Subject to any disclaimer, the term of this patent is extended or adjusted under 35 U.S.C. 154(b) by 778 days.

(21) Appl. No.: 11/556,652

(22) Filed: Nov. 3, 2006

(65) Prior Publication Data

US 2007/0125792 A1 Jun. 7, 2007

Related U.S. Application Data

(60) Provisional application No. 60/732,642, filed on Nov. 3, 2005.

(51) Int. Cl.
*G05D 3/00* (2006.01)

(52) U.S. Cl. ............................ 318/466; 53/52; 53/260; 53/574; 53/576

(58) Field of Classification Search ................. 220/908, 220/908.1, 495.01; 206/205; 318/5, 17, 318/135, 466, 480, 473, 478, 568.16; 53/52, 53/248, 260, 376.3, 476, 505, 511, 574, 576; 604/317

See application file for complete search history.

(56) References Cited

U.S. PATENT DOCUMENTS 3,665,522 A * 5/1972 Backlund et al. ............... 4/484
3,878,572 A * 4/1975 Eriksson ........................ 4/484
4,025,969 A * 5/1977 Dahlen .......................... 4/484
5,022,553 A 6/1991 Pontius
5,158,199 A 10/1992 Pontius
5,174,462 A 12/1992 Hames
5,386,770 A * 2/1995 De Boer ..................... 100/177
5,535,913 A 7/1996 Ashbach et al.

(Continued)

FOREIGN PATENT DOCUMENTS

EP 0 903 305 3/1999

(Continued)

OTHER PUBLICATIONS

Photograph of Cosco Diaper Pail; 1 page.

(Continued)

*Primary Examiner*—Bentsu Ro
*Assistant Examiner*—Antony M Paul
(74) *Attorney, Agent, or Firm*—Lempia Braidwood LLC

(57) ABSTRACT

A diaper pail has a body with an interior container space and an access opening into the interior container space. A diaper receptacle is also in the body and has a diaper receiving opening into the receptacle. An obstruction is provided that can be moved between a receiving orientation and a dumping orientation. In one aspect, an input device I configured to signal a part of the diaper pail to automatically operate the obstruction between the dumping orientation and the receiving orientation to receive a soiled diaper into the diaper receptacle and to dump the soiled diaper from the diaper receptacle into the interior container space. In another aspect, an activated charcoal filter is in communication with at least the interior storage space and is designed to chemically eliminate odors that emanate from the soiled diapers in the interior storage space.

26 Claims, 17 Drawing Sheets

U.S. PATENT DOCUMENTS

| | | | | |
|---|---|---|---|---|
| 5,655,680 | A | 8/1997 | Asbach et al. | |
| 5,765,339 | A | 6/1998 | Garland | |
| 6,128,890 | A * | 10/2000 | Firth | 53/567 |
| 6,129,890 | A * | 10/2000 | Lunk et al. | 419/4 |
| 6,145,283 | A * | 11/2000 | Noordenbos et al. | 53/554 |
| 6,211,637 | B1 * | 4/2001 | Studer | 318/466 |
| 6,370,847 | B1 * | 4/2002 | Jensen et al. | 53/459 |
| 6,415,947 | B1 | 7/2002 | Kim | |
| 6,516,588 | B2 * | 2/2003 | Jensen et al. | 53/459 |
| 6,612,099 | B2 * | 9/2003 | Stravitz | 53/526 |
| 6,719,194 | B2 * | 4/2004 | Richards | 232/43.1 |
| 6,793,096 | B1 | 9/2004 | Seok | |
| 6,804,930 | B2 * | 10/2004 | Stravitz | 53/211 |
| 7,256,694 | B2 * | 8/2007 | Papari et al. | 340/565 |
| 7,503,159 | B2 * | 3/2009 | Stravitz et al. | 53/567 |
| 7,594,376 | B2 * | 9/2009 | Chomik | 53/567 |
| 7,617,659 | B2 * | 11/2009 | Stravitz et al. | 53/567 |
| 2003/0010415 | A1 | 1/2003 | Szuszkiewicz | |

FOREIGN PATENT DOCUMENTS

| | | |
|---|---|---|
| WO | WO 96/06788 | 3/1996 |

OTHER PUBLICATIONS

Photograph of Safety 1st Odorless Diaper Pail; 1 page.

Photographs of Safety 1$^{st}$ Neat Diaper Disposal System from www.amazon.com; 2 pages.

Photograph of Playtex Diaper Genie Diaper Pail; 1 page.

Print out from www.tinytots.com of the Baby Trend Diaper Champ; 2 pages.

Print out from www.specialtybaby.com of the Regal Lager Diaper Dekor; 1 page.

International Search Report and Written Opinion issued on Apr. 5, 2007 in International Application No. PCT/US2006/060546.

* cited by examiner

FIG. 1
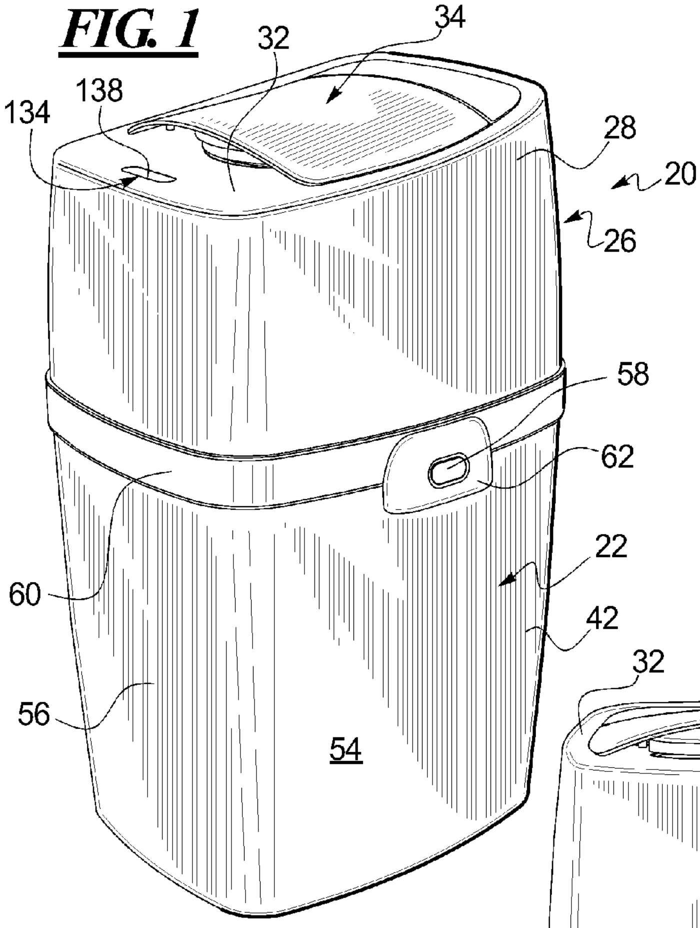
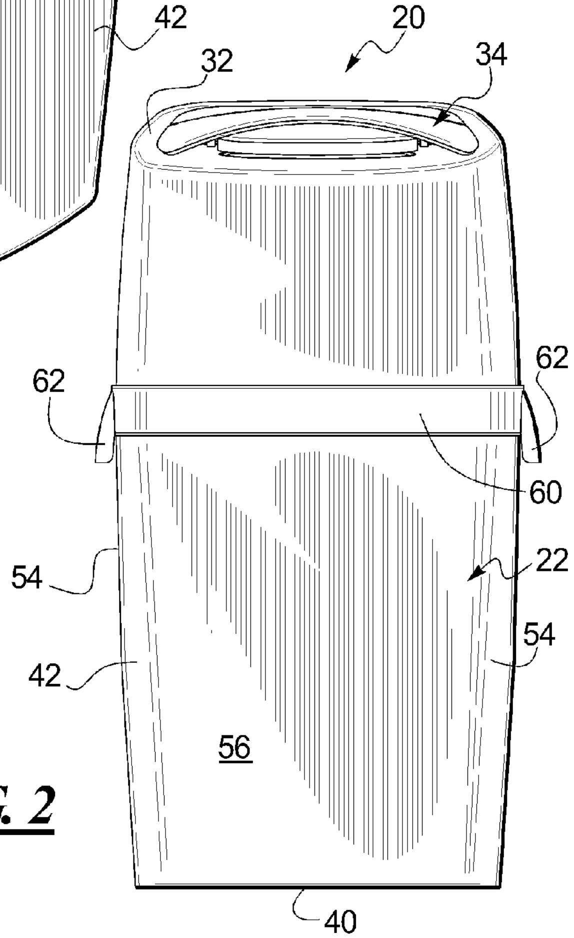
FIG. 2

*FIG. 15D*
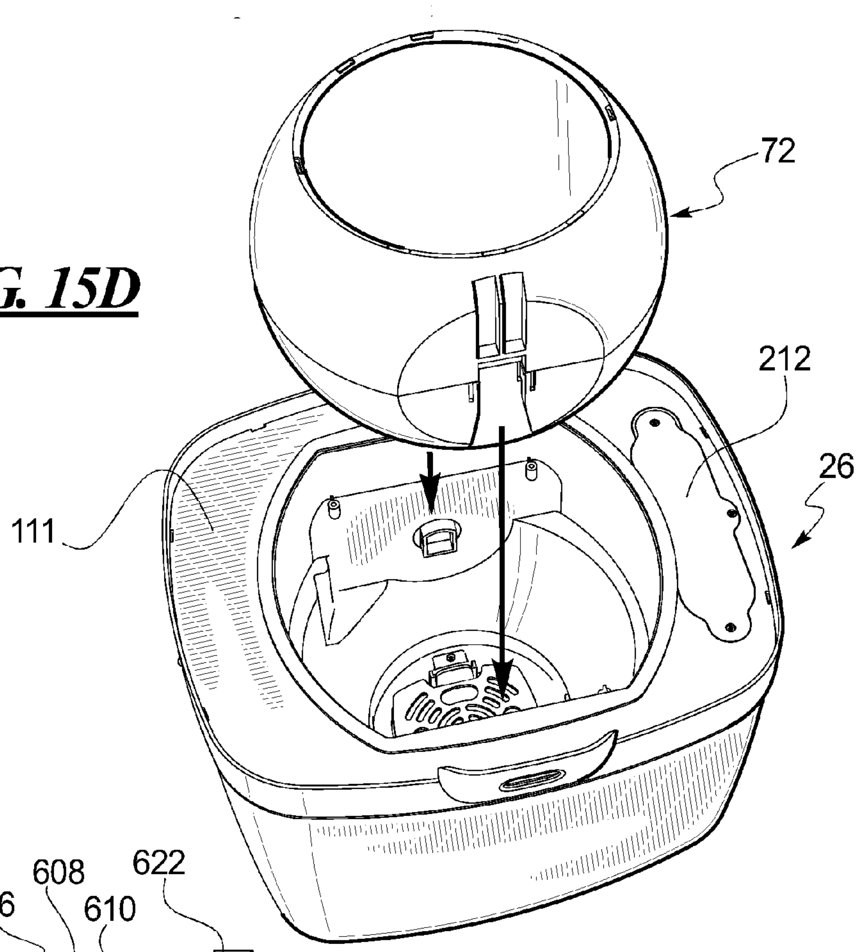
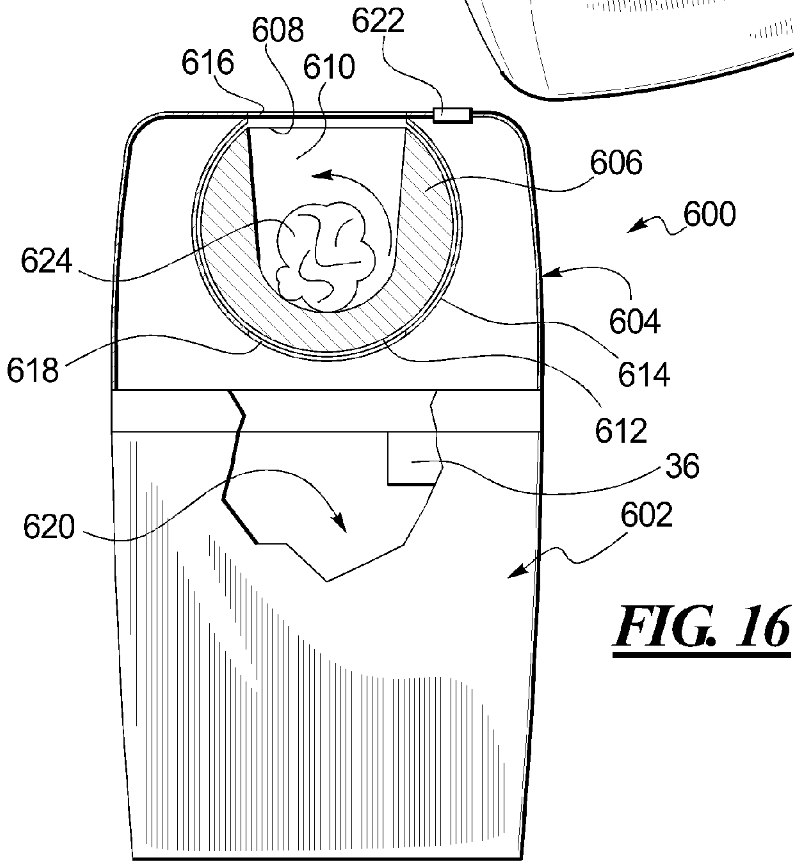
*FIG. 16*

DIAPER PAIL

RELATED APPLICATION DATA

This patent is related to and claims priority benefit of U.S. Provisional Patent Application Ser. No. 60/732,642, which was filed on Nov. 3, 2005, and which was entitled "Diaper Pail." The entire content of the prior filed provisional application is incorporated herein by reference.

BACKGROUND OF THE INVENTION

1. Field of the Disclosure

The present disclosure is generally directed to waste containers for diapers, and more particularly to a touch-free diaper pail that can be operated without the need for the user to touch the diaper pail.

2. Description of Related Art

The diaper changing process is common to most families with children. Caregivers face the issue of what to do with a soiled diaper. Some caregivers choose reusable cloth diapers and manually dispose of the waste. The cloth diapers are then washed and reused. However, it has become much more common to use disposable diapers. Some people choose simply to toss a soiled disposable diaper in their regular trash. However, soiled diapers emit unpleasant odors.

Diaper pails and other devices for disposing of soiled diapers are known in the art. A conventional diaper pail is typically used to temporarily store soiled diapers in the vicinity of where the diaper changing process took place, such as in a child's nursery or adjacent a changing table. Every few days, the caregiver must empty the diaper pail as it fills with dirty or soiled diapers.

Many diaper pails don't prevent odors from the soiled diapers from escaping into the environment adjacent the diaper pail. Many diaper pails are also fairly difficult to use. It can be difficult for the caregiver to place a soiled diaper in the container of the diaper pail. Some of these more difficult to use diaper pails have mechanisms that are not intuitive to the average caregiver. Some of these more difficult to use diaper pails also require at least one or even both hands to properly operate the unit in order to dispose of a soiled diaper.

Some diaper pails require the use of proprietary, custom fit bags. The proprietary bags can be quite expensive and can be difficult to install and replace in the pail. Additionally, some proprietary bags can only be purchased at select retailers and, thus, can be difficult to obtain at times for an average caregiver. Many of these types of diaper pails are wasteful in that the amount of plastic used per each soiled diaper is much larger than if one were to use a regular trash bag.

Some diaper pails known in the art do not fit particularly well in a nursery. For example, many diaper pails have a circular cylinder configuration and, thus, have a circular footprint. The circular diaper pail does not fit in many conventional storage locations within a nursery or other home environment. Thus, some diaper pails can take up unnecessary space when used.

There are diaper pails on the market that have attempted to address one or more of the above-noted issues. However, there is no diaper pail available today that addresses all of the problems and disadvantages discussed above. One such diaper pail product uses a scented tablet made out of a scented plastic in attempting to mask the odor of soiled diapers. The effect has been shown to be minimal. This product has a lid that can be opened by pressing on a foot pedal at the base of the pail. This product also uses standard trash bags. The product does not eliminate odors, must be touched by the user's foot, and has a round footprint making it difficult to place in a home environment.

A second known diaper pail product has two spring loaded arms that pinch closed the bag that holds the soiled diapers. This same product also has a compartment in the lid that can receive an air freshener, which only attempts to mask the odor of soiled diapers. This same product has a push button that the user must push to open a lid and expose the receptacle in which the soil diaper can be placed. This product also uses standard trash bags. Thus, the second known product does not eliminate soiled diaper odors, still must be touched by the user in order to open the unit, and also has a round footprint making it difficult to store the unit within the home environment.

A third known diaper pail product attempts to contain soiled diaper odors by preventing the odors from escaping the containment bag. This product uses two sets of spring loaded arms to pinch the bag closed. This third product must be operated by hand in order to dispose of soiled diapers, uses proprietary trash bags, and also has a round cylinder configuration.

A fourth known product attempts to contain soiled diaper odors by preventing the odors from escaping the containment bag. This is accomplished by twisting each soiled diaper into its own compartment within a long, thin plastic bag, which may be compared to the outer skin of sausage links. The proprietary bags are scented in order to help mask the odors of the soiled diapers. This product again must be manually operated by the user. This fourth product does not eliminate odors, must be manually operated, uses proprietary trash bags, and again has a round footprint.

A fifth known product attempts to contain soiled diaper odors by employing a mechanism that drops the diaper into a containment area without exposing the odor of the soiled diaper to the environment. The containment area is sealed in an attempt to prevent escape of the soiled diaper odors. The seals are not particularly tight, so odor can and does escape the containment area. This product has a handle that must be manipulated by the user in order to turn a hole upside down to drop a diaper into the containment area. This product does use standard trash bags. Thus, this known diaper pail must be manually operated, does not eliminate diaper odors, and also has a round footprint.

Yet another known product employs trap doors and minimal seals to attempt to prevent odors from escaping the diaper pail. This sixth known product also uses proprietary scented bags to help mask soiled diaper odors. This product employs a foot pedal in order to raise the lid exposing the diaper receptacle. This product does have a rectangular footprint rendering it a better fit within the home environment. However, this sixth known product does not eliminate diaper odors, must be touched in order to be used, and uses proprietary scented trash bags. Standard trash bags can be used with this sixth known product, but the minimal masking impact gained by using the proprietary scented bags is lost.

BRIEF DESCRIPTION OF THE DRAWINGS

Objects, features, and advantages of the present invention will become apparent upon reading the following description in conjunction with the drawing figures, in which:

FIG. 1 is a perspective view of one example of a diaper pail constructed in accordance with the teachings of the present invention.

FIG. 2 is a front view of the diaper pail shown in FIG. 1.

FIGS. 15A-15D show the steps for disassembling the bucket of the diaper pail shown in FIGS. 1-4.

FIG. 16 shows a simplified partial cross-section and cut-away view of another example of a diaper pail constructed in accordance with the teachings of the present invention.

DETAILED DESCRIPTION OF THE DISCLOSURE

The diaper pail disclosed herein solves or improves upon the above-noted and other problems and disadvantages known with respect to prior art diaper pails. The disclosed diaper pail can be operated in an entirely touch-free manner wherein the user need not touch the diaper pail at all in order to properly dispose of a soiled diaper. The disclosed diaper pail also can use standard readily available trash bags. The disclosed diaper pail also has a generally rectangular configuration making it more space efficient to place and store in the home environment. The disclosed diaper pail also includes an odor-eating activated charcoal filter that can be replaced by the user and that chemically eliminates odors instead of merely masking or sealing odors that emanate from soiled diapers. The disclosed diaper pail also employs an advanced seal construction to assist in containing any odors that emanate from soiled diapers but not eliminated by the charcoal filter. The disclosed diaper pail has an obstruction that divides the pail into two chambers including a diaper receiving chamber and an interior storage space. The obstruction can be automatically moved according to a signal received from either a touch free device or a touch device. These and other features and advantages of the invention fill become apparent upon a review of this disclosure.

Figure 3:
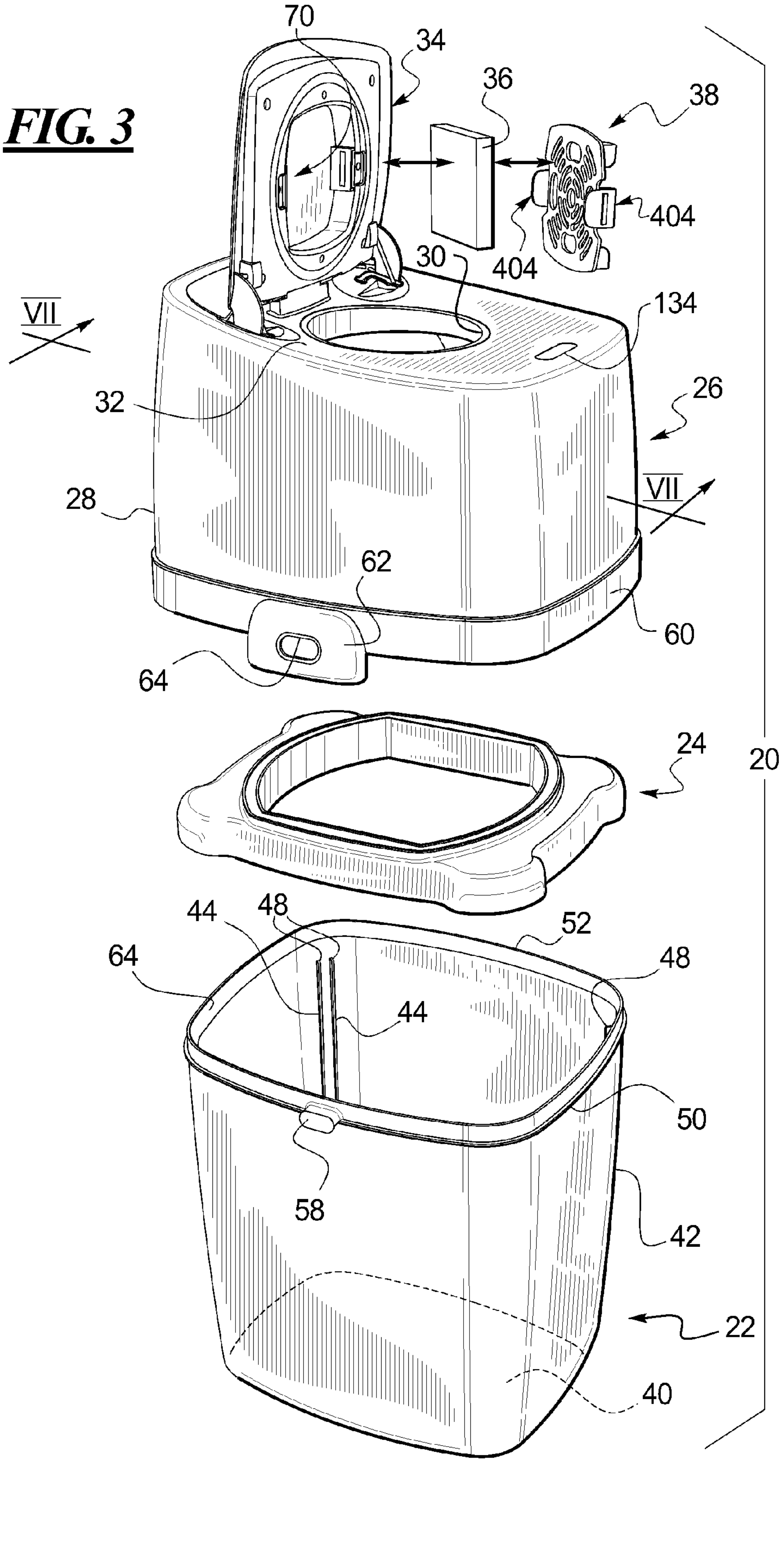
FIG. 3 is a partial exploded view of the diaper pail shown in FIG. 1.

Turning now to the drawings, FIG. 1 shows a perspective view of a diaper pail 20 constructed in accordance with the teachings of the present invention. FIG. 2 shows a front view of the diaper pail shown in FIG. 1 and FIG. 3 shows a partially exploded view of the basic diaper pail components. The disclosed example of a diaper pail 20 generally includes a base container 22 and a base ring 24 that rests within the base container. A top assembly 26 has a shell 28 and rests on top of the base container 22. An access opening top opening 30 is provided in the top surface 32 of the shell 28 for receiving diapers to be stored in the diaper pail. A lid assembly 34 is provided on the shell 28 and is movable either to expose or close off the top opening 30. An odor-eating cartridge or filter 36 is stored in the lid assembly 34 and held in place by a cartridge cover 38.

The base container 22 generally has a bottom surface 40 and an upstanding side wall 42 extending upward from a perimeter of the bottom surface. In this example, the base container 22 has a generally rectangular footprint and is a generally rectangular tapered cylinder. A plurality of protrusions 44 project inward from the side wall 42, and in this case from the four corners of the interior of the side wall. These protrusions 44 are sized and positioned to properly locate and support the base ring 24 for purposes described herein below. The base ring 24 drops into a top opening 46 located at the top edge of the side wall 42 and is supported on the upper facing ends 48 of the protrusions.

The base container 22 has a rim 50 extending radially outward from an exterior surface of the side wall 42 and spaced below a top edge 52 of the side wall. The side wall 42 in this example has a pair of elongate sides 54 and a pair of shorter ends 56 that cooperate to form the rectangular cylinder side wall 42. In the disclosed example, a pair of buttons 58 protrudes outward in opposite directions, one from each of the sides 54 of the side wall 42. Each button 58 is located generally at the level of the rim 50 as shown in FIG. 3.

The top assembly 26 has a contour that generally matches that of the container base side wall 42. The top assembly has a downward depending skirt 60 extending around a perimeter of the bottom side of the top assembly. A pair of ears 62 is provided on opposite sides of the top assembly on the skirt 60. Each of the ears 62 includes a button opening 64 as shown in FIG. 3. When assembled, the lid assembly 26 drops onto the top edge 52 of the base container 22. The skirt 60 encompasses the top end of the side wall 42 above the rim 50 and the ears 62 slide over the buttons 58. The buttons are received in or snap into the ear openings 64 when the diaper pail is assembled as shown in FIG. 1 and assist in holding the top assembly 26 on the base container 22.

The lid assembly 34 of the diaper pail in this example can pivot between a closed position shown in FIGS. 1 and 2 to cover the top opening 30 and an open position shown in FIG. 3 to expose the top opening in the shell 28. An underside of the lid assembly 34 includes a cartridge bay 70 that is sized to receive the odor filter or cartridge 36 within the bay. As described in greater detail below, the cartridge cover 38 snaps into or over the bay 70 to retain the cartridge 36 in position under the lid assembly 34.

Figure 4:
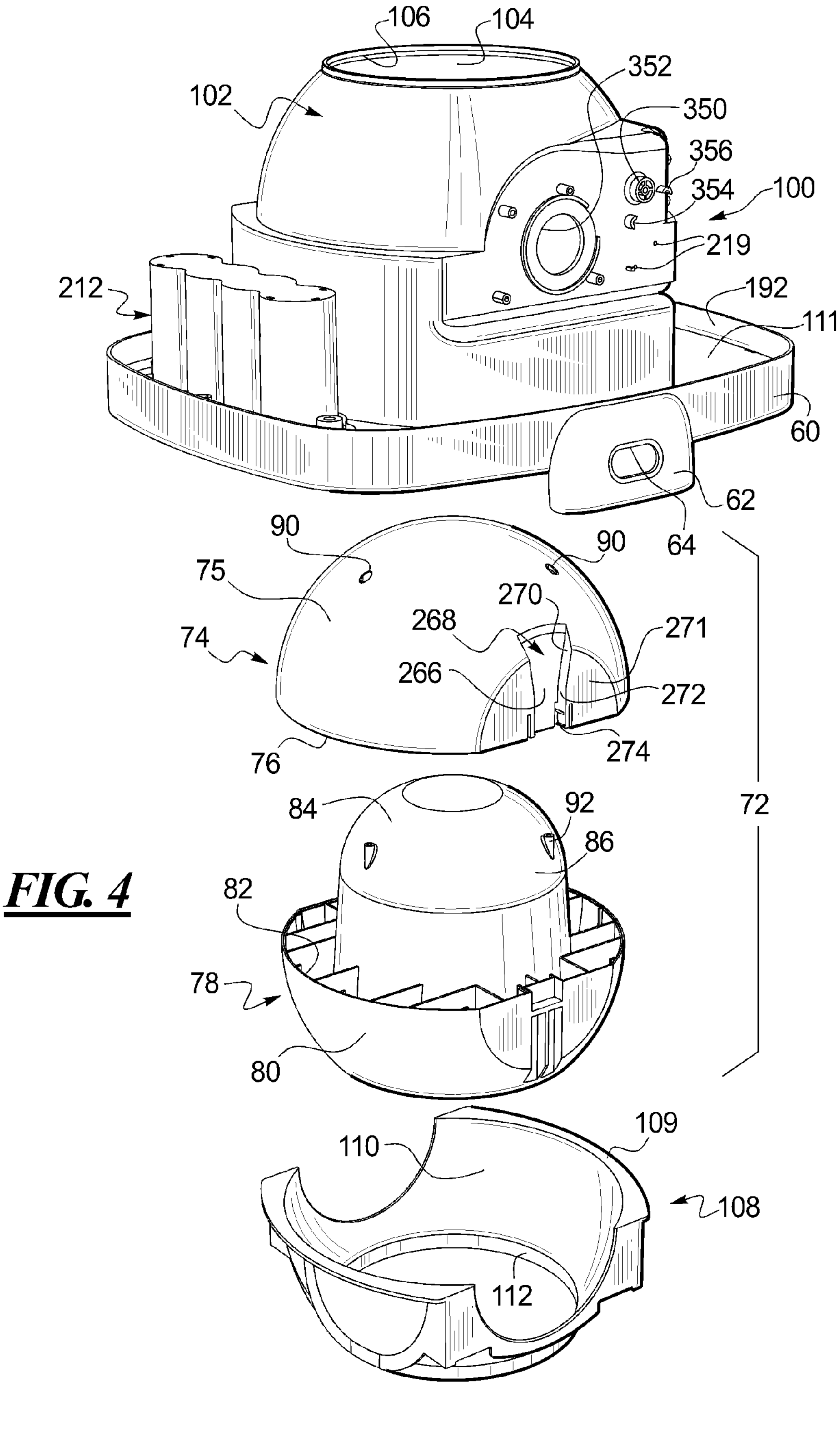
FIG. 4 is a partial exploded view of interior components of the top assembly, minus its top outer shell, shown in FIG. 3.

The top assembly 26 of the disclosed diaper pail 20 houses the primary working components of the pail. FIG. 4 is an exploded view of a portion of the top assembly, minus the shell 28, the lid 34, and the various mechanisms housed within the top assembly. However, FIG. 4 illustrates a diaper disposal bucket 72 that operates to dispose of diapers as described below. In this example, the diaper disposal bucket 72 is formed in two halves or sections that are snapped, fastened, or otherwise secured together. An upper section 74 of the bucket in this example has an exterior semi-spherical surface and an exposed mating edge 76. The upper section 74 is generally hollow and can receive therein a portion of a lower bucket section 78 as depicted in FIG. 4. The lower section 78 also has an exterior semi-spherical surface 80 and a mating edge 82. An exterior surface 84 of a thimble-shaped diaper receptacle 86 extends from the lower section in the direction of and beyond the mating edge 82. When assembled, the two bucket sections 74 and 78 are joined together with the mating edges 76 and 82 abutting one another. The semi-spherical surface 75 of the upper section and the semi-spherical surface 80 of the lower section combine to form a generally spherical outer surface of the bucket 72 in this example. In this example, the upper section 74 has a plurality of fastener openings 90 and the lower section 78 has a plurality of fastener posts 92 carried on the exterior bucket surface 84. Fasteners can be placed through the openings 90 and threaded into the posts 92 to secure the two parts together. In an alternative example, the two bucket sections can be configured to snap together. Alternatively, the bucket 72 can be formed as a single unitary structure without departing from the spirit and scope of the present invention.

As shown in FIG. 4, the top assembly 26 includes an inner housing 100 that houses or carries a majority of the diaper pail working components. In this example, the housing 100 is shaped to form an upwardly domed receptacle 102 that has a semi-spherical interior surface 104 configured to conform to and bear against the exterior semi-spherical surface of the bucket 72. As shown in FIG. 4, the domed receptacle 102 is inverted and has a truncated open top 106. A bucket holder 108 is also formed having a frame 109 and a semi-spherical interior surface 110 carried by the frame. The surface 110 is conformed to match and bear against the exterior spherical surface of the bucket 72. When assembled, the holder 108 is secured to part of an bottom panel 111 of the housing 100 adjacent the domed receptacle 102. The interior surface 110 of the holder 108 combines with the interior surface 104 of the domed receptacle 102 in the housing to capture the generally spherical bucket 72 in the housing 100. The bucket holder 108 also has a truncated open bottom 112 that essentially matches the size of the open top 106 in the domed receptacle 102 and is positionally offset about 180° in this example relative to the open top of the housing. Particular details and functions of the bucket 72 and the top assembly 26 are described in greater detail herein with occasional reference to these previously discussed figures when describing other features of the top assembly.

Figure 5:
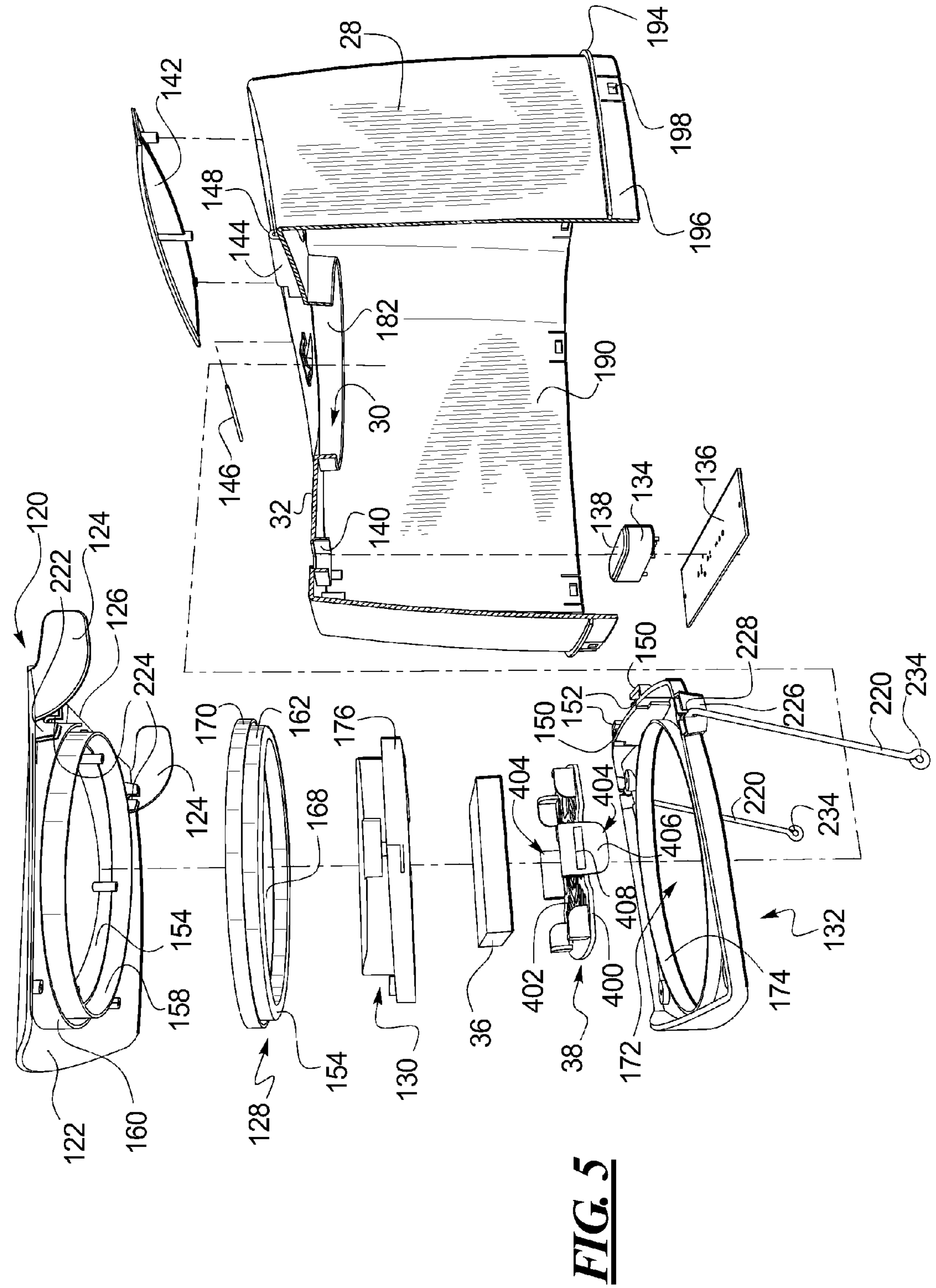
FIG. 5 is an exploded view of the lid assembly and outer shell of the top assembly for shown in FIG. 3.

FIG. 5 is an exploded view of the lid assembly 34 and the shell 28 of the top assembly 26. In this example, the lid assembly 34 includes a lid cover 120 that has a top panel 122 and a pair of pivot guides 124 that are spaced apart on opposite sides of the lid. The pivot guides 124 are generally flat and extend downward and curve rearward from a pivot end 126 of the lid. The pivot guides are received through slots 127 (FIGS. 7 and 8) in the top surface 32 of the shell 28 and assist in stabilizing the lid and maintaining proper lid orientation as it is opened and closed. The lid assembly 34 also employs a silicone seal 128 that is captured between components of the lid assembly as described below. The lid assembly 34 also has a cartridge housing 130 that is configured to create the cartridge bay 70. The lid assembly 34 also includes the removable cartridge or filter 36 and the cartridge cover 38 as previously described. The lid assembly also has a bezel 132 that surrounds the cartridge housing and helps to secure the various components of the lid assembly together.

The shell 28 of the top assembly 26 carries a sensor 134 that is mounted to a circuit board 136 within the interior of the shell 28. In this example, an active interface 138 of the sensor 134 is exposed through an opening 140 in the top surface 32 of the shell 28 as shown in FIGS. 1 and 5. A decorative cover 142 is attached to the top surface 32 of the shell 28 in this example adjacent the pivot end 126 of the lid assembly. A hinge block 144 supports an axle 146 in an elongate lateral opening 148 through the block. Ends of the axle extend beyond the edges of the hinge block and are exposed to assist in forming a hinge structure for the lid. The bezel 132 in this example has a pair of hinge protrusions 150 extending from a rear edge of the bezel. Each of the protrusions includes an upward facing axle notch 152. The exposed ends of the axle 146 are captured within the notches 152 between the hinge protrusions 150 and the underside of the lid panel 122 when the lid assembly 34 is assembled.

Figures 6A, 6B:
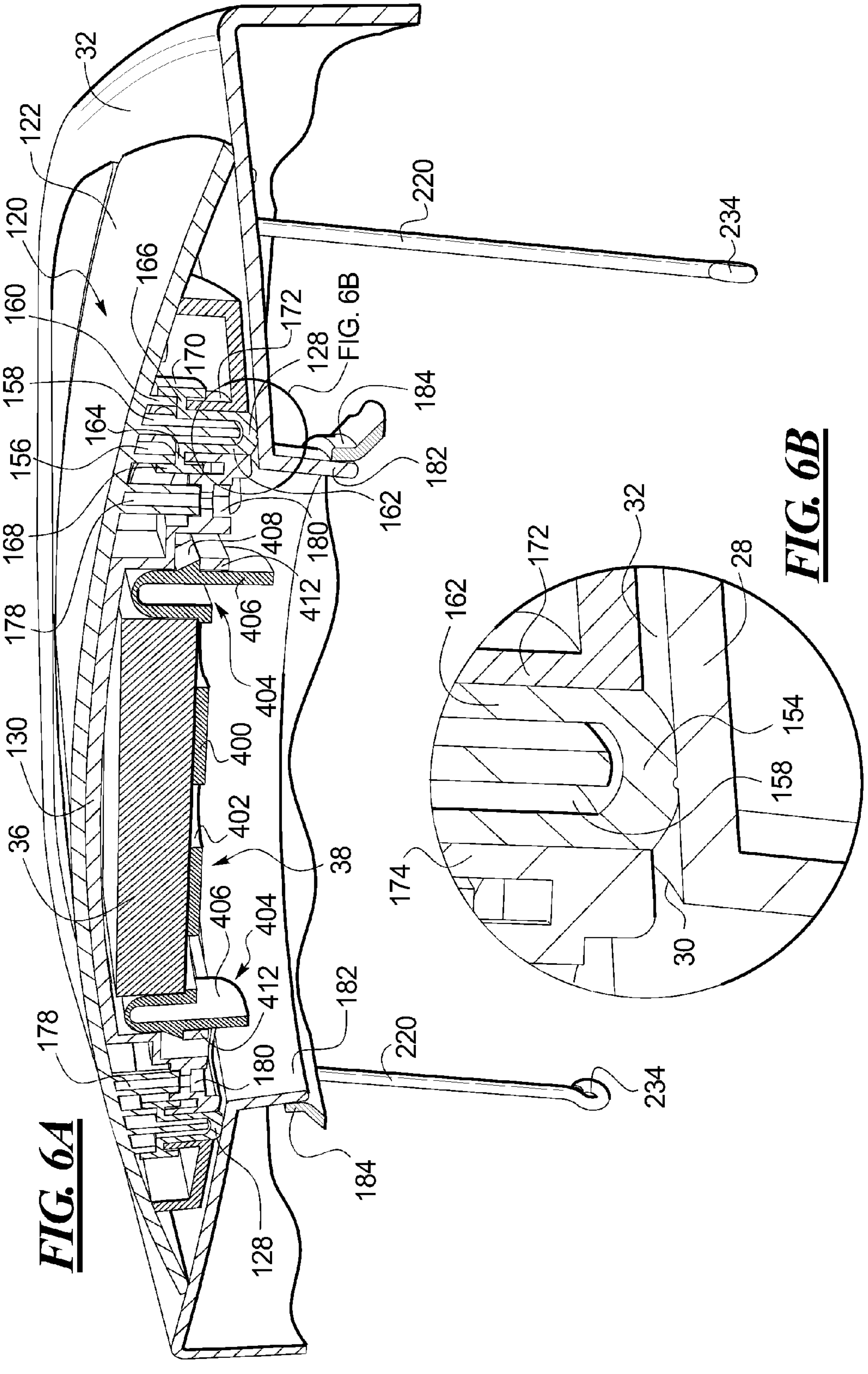
FIG. 6A is a cross-section of the assembled lid assembly of the diaper pail shown in FIG. 5.
FIG. 6B is an enlarged view of the gasket or seal between the lid assembly and top assembly shown in FIG. 6A.

FIGS. 6A and 6B illustrate a cross-section of the lid assembly 34 when assembled and closed over the top opening 30. As shown in FIGS. 5 and 6A, the silicone seal 128 in this example is captured between the lid panel 122 and the bezel 132 exposing a resilient compression seal surface 154 that contacts the top surface 32 of the shell 28 surrounding the top opening 30. The underside of the lid panel 122 includes a plurality of annular spaced apart rings 156, 158, and 160. The middle ring 158 is sandwiched between the inner ring 156 and the outer ring 160 and is taller (depends further downward) than the inner and outer rings. The seal 128 has a U-shaped annular section 162. The middle ring 158 seats within the annular section 162. The upper ends of the U-shaped part 162 of the seal 128 each have a horizontal web 164 and 166, one extending radially inward and one extending radially outward. Each web is connected to the middle of a vertically oriented annular collar 168 and 170. The U-shaped part, the webs, and the annular collars of the seal 128 are all formed as an integral silicone structure in the disclosed example.

As shown in FIG. 5, the bezel 132 has a center opening 172 sized to receive the cartridge housing 130 therein. In the disclosed example, the bezel has an annular lip 174 extending around and defining the cartridge housing opening 172. The outer web 166 of the seal 128 is captured between an upper edge of the lip 174 of the bezel 132 and the outer ring 160 on the underside of the lid panel 122 in this example. Similarly, a perimeter of the cartridge housing 130 includes an upward extending lip 176. The inner web 164 of the seal 128 is captured between an upper edge of the lip 176 and the lower edge of the inner ring 156 on the underside of the lid panel 122.

In the disclosed example, the underside of the lid panel 122 includes a plurality of fastener receptacles or posts 178 depending therefrom. The cartridge housing 130 includes a plurality of corresponding fastener openings 180 that align with the fastener posts 178 when the cartridge housing 130 is installed. Fasteners (not shown) can be used to secure the cartridge housing in place on the underside of the lid cover 120 in the disclosed example. Though not shown herein, the bezel 132 and the lid cover 120 can include similar posts and fastener openings to secure the bezel in place. Alternatively, these lid parts can be snapped together or formed as an integral unit. As shown in FIG. 6B, the resilient seal surface 154 is positioned at the bottom of the U-shaped part 162. In the disclosed example, when the seal 128 is installed and the lid assembly 34 is assembled, the bottom edge of the middle ring 158 on the underside of the lid cover 120 is spaced slightly from the inside or inner surface of the U-shaped part 162 of the seal. Thus, when the lid is closed to cover the top opening 30 in the shell 28, the seal can be compressed against the bottom of the ring 158, creating a relatively wide contact surface area between the seal and the top assembly to create a very good, air-tight seal.

Also as depicted best in FIG. 5, the top opening 30 in the top surface 32 of the shell 28 has a downward depending lip 182. When the top assemble is assembled, the open top 106 of the inner housing 100 of the top assembly seats around this lip 182. In the disclosed example, the upper edge of the open top

106 of the housing 100 can also include an upward extending lip 184 that seats over or around the lip 182. This arrangement assists in creating a sealed environment within the diaper pail. As will be evident to those having ordinary skill in the art, the engagement between the top assembly shell 28 and the housing 100, and in particular around the top opening 30, can vary and yet fall within the spirit and scope of the present invention. These parts can also be combined into an integral unitary structure. Also, the particular construction of the lid, bezel, seal, and cartridge housing can also vary considerably and yet fall within the spirit and scope of the present invention. The goal is to provide a substantial air-tight seal when the lid is closed and in this example, a lid that pivots open and closed and mounting location for the file filter.

Figure 7:
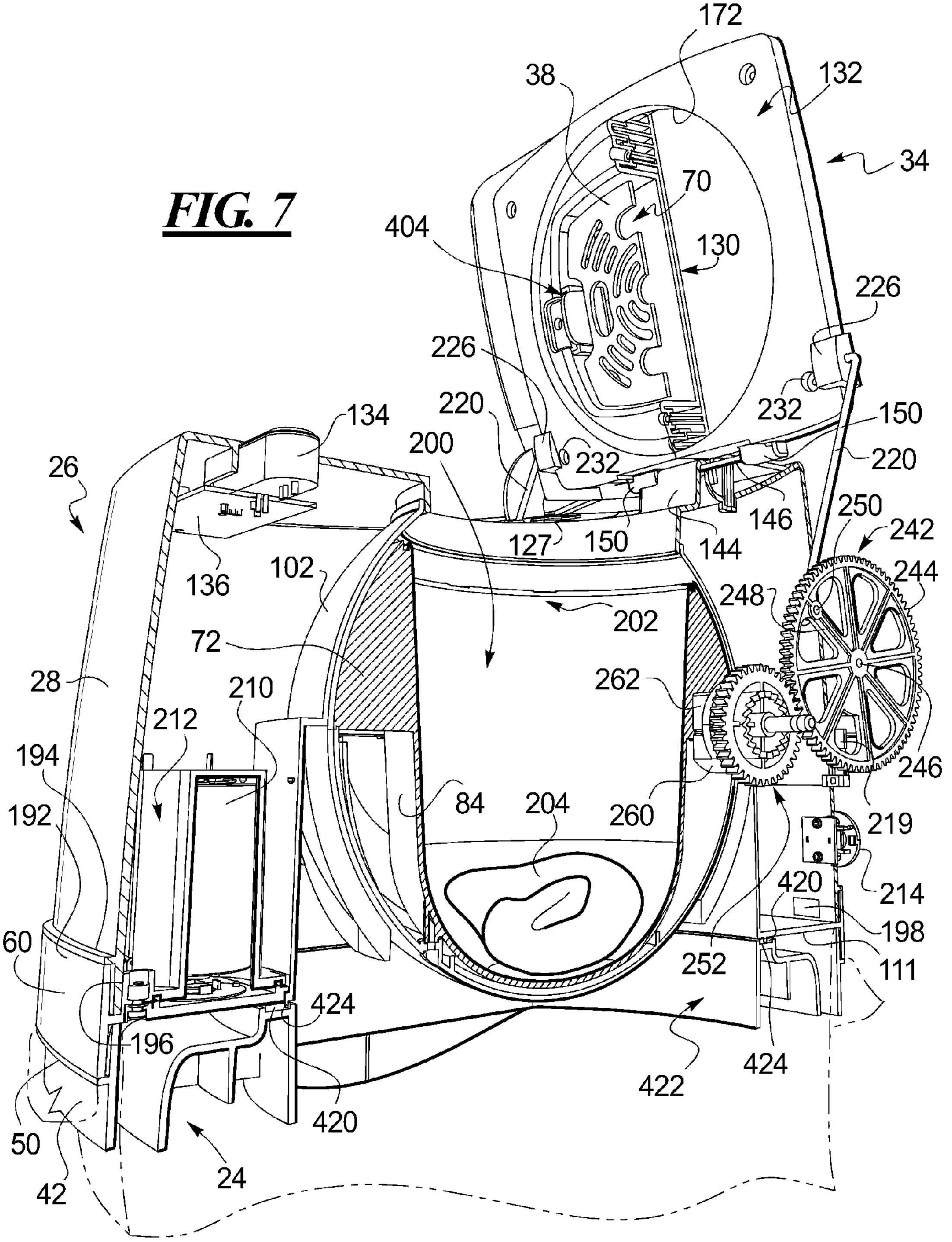
FIG. 7 is a cross-section taken along line VII-VII of the top assembly of the diaper pail shown in FIG. 3.

Similarly, the construction of the lid attachment to the top assembly can also vary and yet fall within the spirit and scope of the present invention. The hinge arrangement disclosed in this example of a diaper pail 20 can be altered and yet perform as intended. FIG. 7 illustrates a cross-section or cut-away that depicts the assembled hinge for the lid. As shown in FIGS. 6A and 7, the decorative cover 142 is employed in the disclosed examples simply to mask the appearance of the lid hinge and its attachments to the top assembly, and particularly when the lid is closed. The various configurations, shapes, and contours of the shell 28, lid 34, lid cover 120, and the like can also vary and yet fall within the spirit and scope of the present invention. The disclosed various components represent one of many possible alternative configurations for a diaper pail as disclosed herein.

Figure 8:
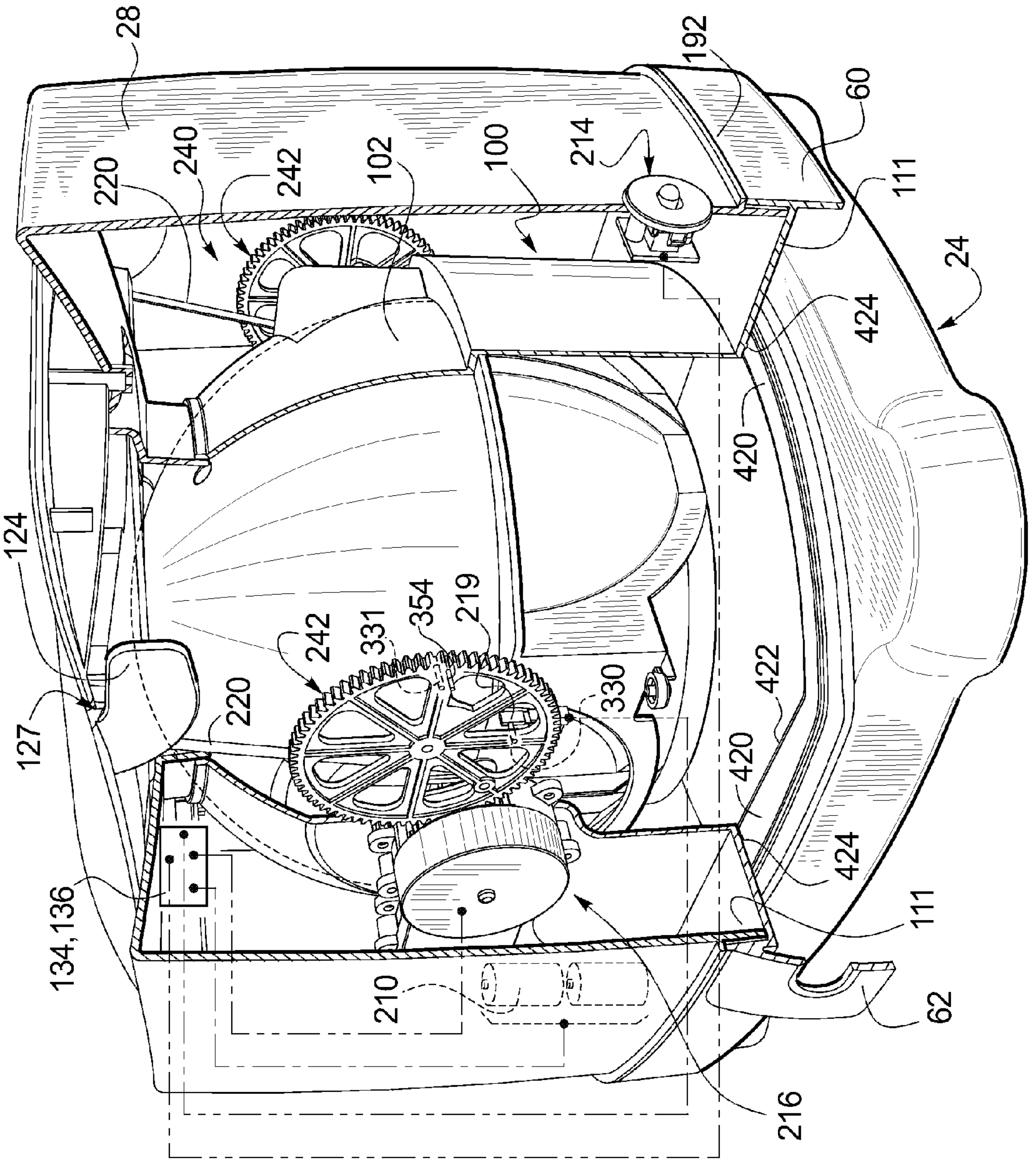
FIG. 8 is a partial cut-away rear view of the top assembly shown in FIGS. 3 and 7.

In the disclosed example shown in FIGS. 7 and 8, the bottom panel 111 of the housing 100 has a perimeter. The skirt 60 of the top assembly 26 depends from the perimeter of the bottom panel. A bottom opening 190 of the generally rectangular shell 28 is configured to nest within an upstanding perimeter wall 192 that, in this example, is generally a continuation upward of the skirt 60 on the housing above an elevation of the bottom panel 111 of the housing 100. The shell 28 also includes a perimeter ridge 194 extending circumferentially around the exterior surface of the shell and spaced upward from a bottom edge. In this example, the lower portion 196 of the side wall of the shell 28 nests within the perimeter wall 192 on the housing. As shown in FIG. 1, the combination of the skirt 60 and the wall 192 form a decorative band sandwiched between the ridge 194 and the rim 50 on the base container. A plurality of snap connectors 198 can be provided with components on both the shell and the housing in order to install the shell 28 onto the housing 100 to assemble the top assembly 26. The particular configuration and engagement between the housing and the shell can vary and yet fall within the spirit and scope of the present invention. Also, the manner in which these components attach to one another can also vary from the snap connectors 198 depicted herein. Again, the top assembly 26 can be configured in a manner that does not incorporate both a shell and a housing and yet fall within the spirit and scope of the present invention.

FIG. 7 illustrates a cross-section of the top assembly 26 with the lid assembly 34 in an open, ready-for-use orientation. As shown in this example, the assembled bucket 72 includes a diaper receptacle 200. With the lid assembly 34 open as shown, a diaper receiving opening 202 in the bucket 72 is aligned with the open top 106, and thus the top opening 30 in the top assembly. Thus, a user can drop a diaper 204 into the bucket receptacle 200 through the top opening. This bucket orientation is the diaper receiving orientation. As described below, the bucket inverts about 180° in this example as the lid assembly 34 closes and covers the top opening 30 as shown in FIG. 8. The bucket opening 202 will then align with the open bottom 112 in the bucket holder 108 resulting in the diaper 204 dropping into the base container 22. This bucket orientation is the dumping orientation. The manner in which the bucket and lid motion is achieved will now be described.

As shown in FIG. 8, the sensor 134 and circuit board 136 are coupled to a plurality of batteries 210 in this example. The batteries are housed in a battery receptacle 212 carried by the housing 100 of the top assembly 26 as best shown in FIG. 4. A switch 214 is electrically coupled to the circuit board 136 and is provided on a back side of the top assembly 26. The switch 214 is provided to permit user selection between an automatic mode of operation for the diaper pail and a manual mode of operation when needed. A bucket drive mechanism 216 is coupled to the bucket 72. The mechanism 216 is electrically coupled to the circuit board 136 and the batteries 210. The drive mechanism 216 generally includes a motor 218 that is actuated by the circuit board and sensor. A pair of stop switches 219 is also provided on the housing 100 and each is electrically coupled to the circuit board 136. These elements are used in combination to create automatic actuation of the diaper pail lid and bucket as is described below.

As shown in FIGS. 8-10B, the drive mechanism 216 in the disclosed example includes a plurality of components that interact with one another to raise and lower the lid assembly 34 and to rotate the bucket 72 simultaneously without a user having to touch the diaper pail. A pair of elongate lift bars 220 is pivotally connected at a top end to the lid assembly 34. The lid assembly includes a pair of stanchions 222 positioned on opposite sides of the lid cover 120. The stanchions 222 are shown in FIG. 5 positioned adjacent the pivot guides 124 and include upward extending notches 224 therein. Also as shown in FIG. 5, the side edges of the bezel 132 includes a pair of spaced apart receivers 226 formed with downward depending slots 228 therein. When the lid assembly 34 is assembled, inwardly bent ends 230 of the lift bars 220 are captured within the slots 228 and notches 224 and the stanchions 222 are nested or captured in the receivers 226. The inwardly bent ends 230 of the lift bars 220 can include washers or swaged ends 232 to retain the lift bars in the slots.

Lower ends of the lift bars 220 each include a loop 234 for attachment to a portion of the drive mechanism. As will be evident to those having ordinary skill in the art, the lift bars and the particular construction of the connections between the lift bars and the drive mechanism 216, as well as the connection of the lift bars to the lid assembly 34 can vary and yet fall within the spirit and scope of the present invention.

Figure 9:
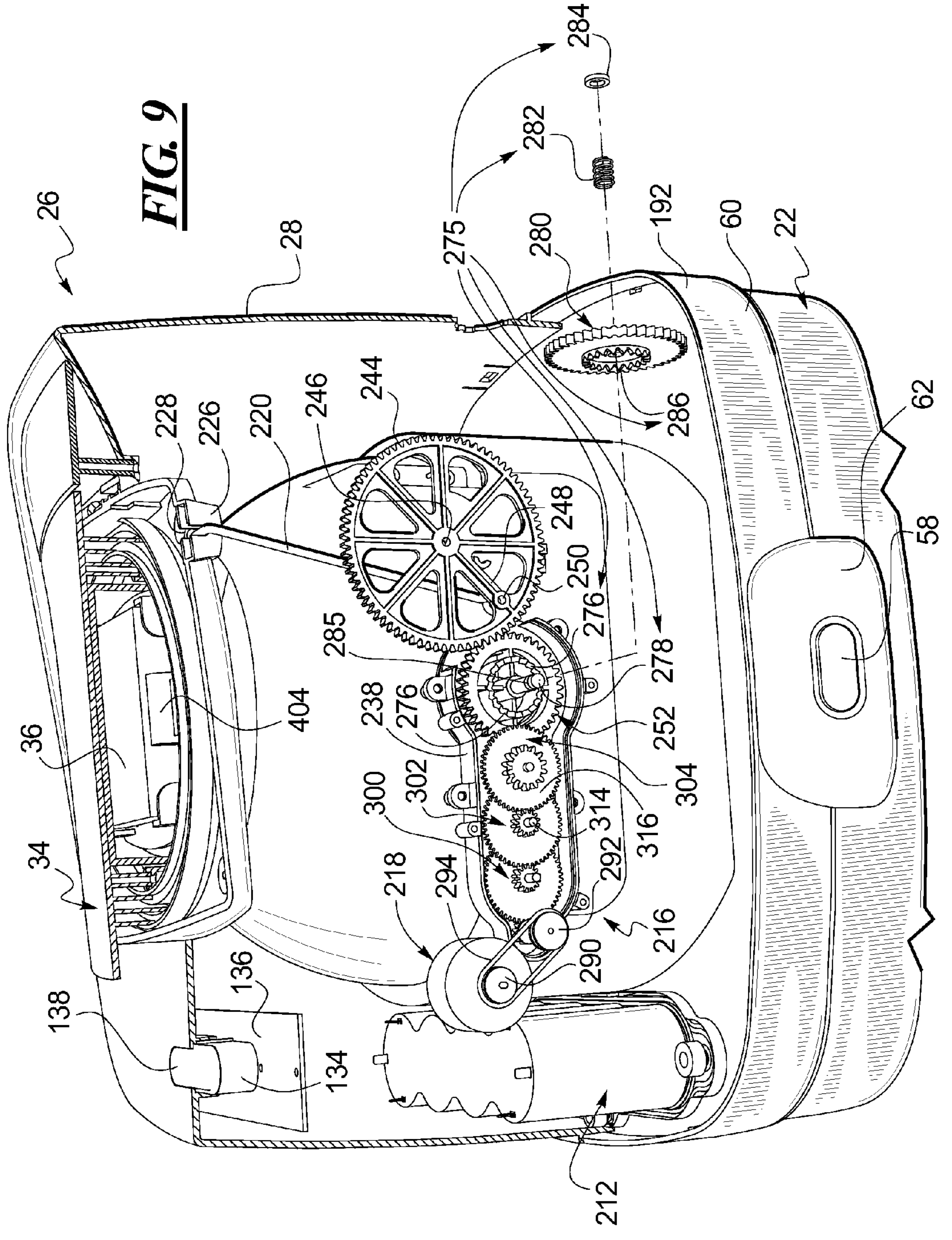
FIG. 9 is a partial cut-away side view of the top assembly shown in FIGS. 3 and 8.
Figure 10A:
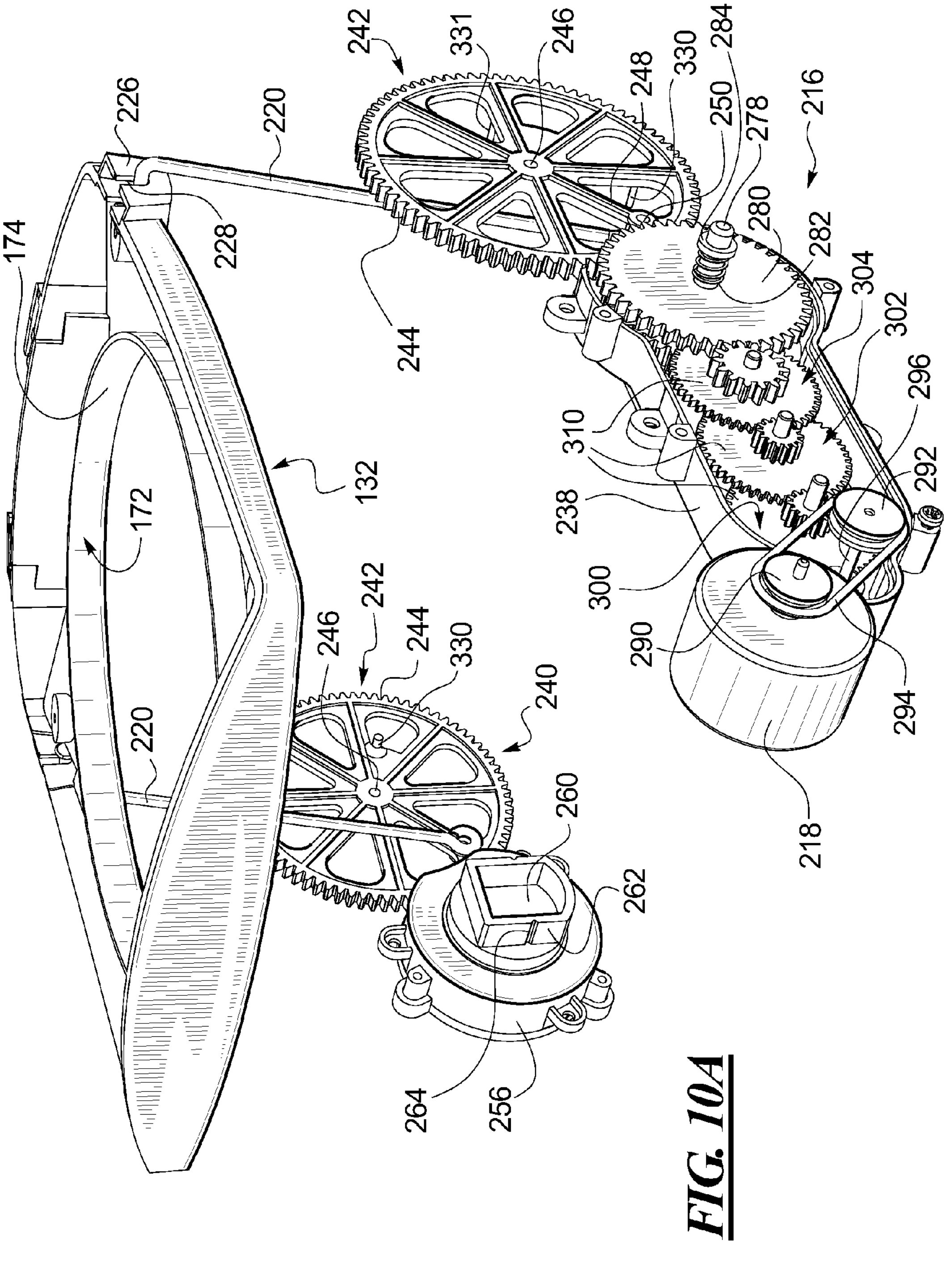
FIG. 10A shows the drive mechanism for operating the diaper pail shown in FIG. 1.
Figure 10B:
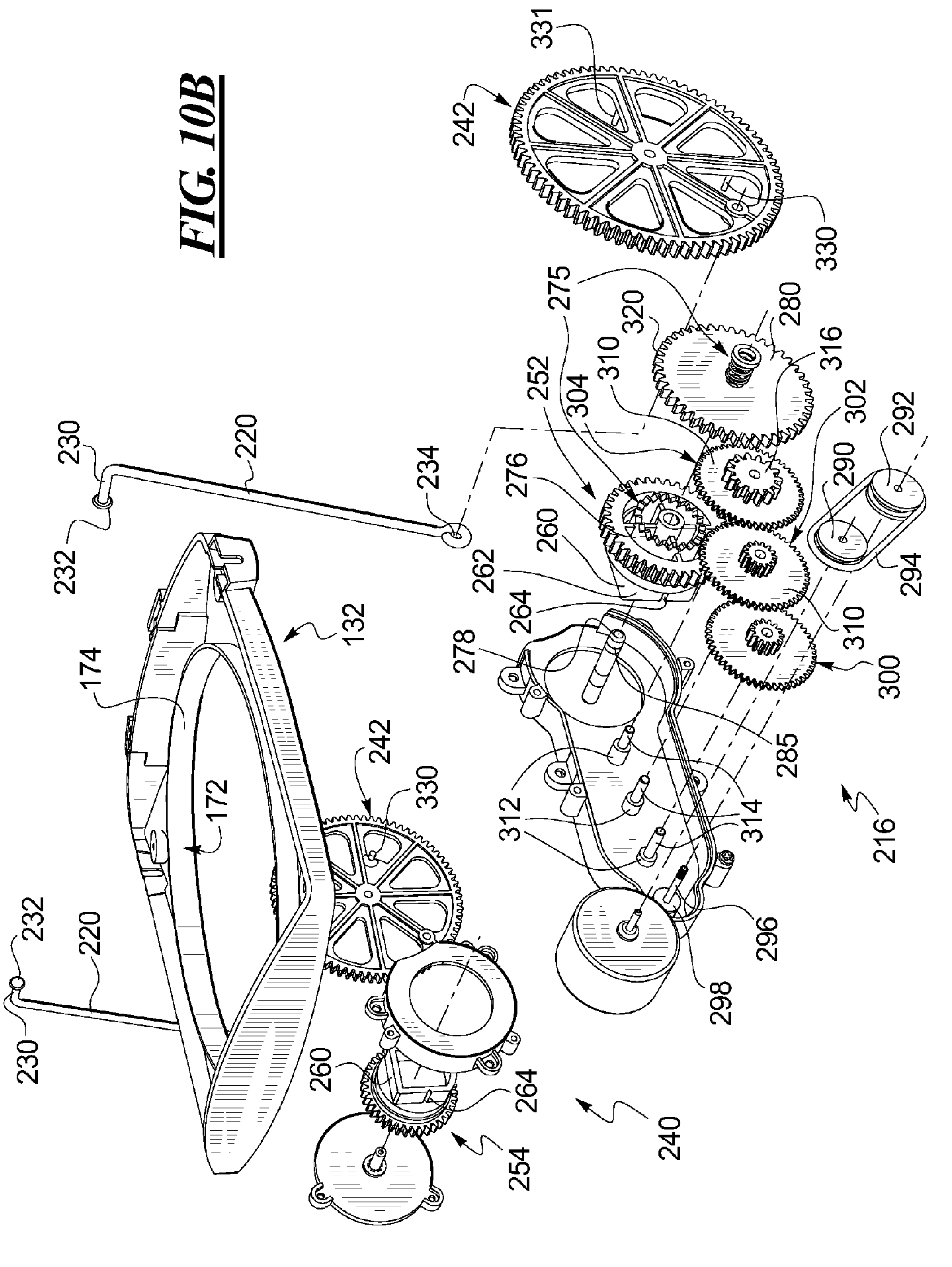
FIG. 10B is an exploded view of the drive mechanism components shown in FIG. 10A.

As shown in FIGS. 9-10B, the drive mechanism 216 has a mechanism cover 238 and is positioned on one side of the bucket 72. An idler mechanism 240 is positioned on the opposite side of the bucket 72. Both the drive mechanism and the idler mechanism include a rotatable lid wheel 242. Each wheel 242 is in the form of a spur gear with external gear teeth 244 and a hub 246. The wheel can rotate about the hub to raise and lower the lid as described in greater detail below. Each lift bar 220 is connected to a respective one of the lid wheels 242. The loop 234 on each lift bar is pivotally coupled to a spoke 248 near the perimeter of each respective wheel 242 by a pivot pin 250.

Each wheel 242 can be pivotally connected at the hub 246 to a portion of the mechanism cover 238 mounted to the top assembly housing 100, or directly to a portion of the top assembly as desired. As shown in FIG. 4, each wheel 242 is mounted to a boss 350 on a side of the domed receptacle 102 of the housing 100. For later description, each side of the domed receptacle 102 also has a rotation opening 352 and a pair of smaller bosses or mechanical stops 354, 356 that are rotationally set apart around the boss 350 and projecting from the housing. The stop sensors or switches 219 are also shown best in FIG. 4.

As shown in FIG. 7, the wheel 242 on the drive mechanism side engages a bucket rotation gear 252. Similarly, the wheel 242 on the idler mechanism 240 engages a bucket rotation gear 254 captured within a gear housing or cover 256 mounted to the housing 100. Each of the bucket gears 252 and 254 has a bucket connector 260 projecting from an inward side of the gear through the openings 352 in the sides of the domed receptacle 102 of the housing. As the gears 252, 254 rotate the bucket connectors 260 will also rotate.

In the disclosed example, each bucket connector 260 has a pair of spaced apart flat side surfaces 262 and a horizontal notch 264 traversing each of the flat side surfaces. As best shown in FIG. 4, the bucket 72 includes a pair of flat regions 266, one on each side of the bucket. A pair of channels 268 is provided that mirror one another, one on each of the flat regions 266 and each has a wider tapered entry 270 at one end of the channel. Each channel also includes a pair of spaced apart side walls 272 configured and sized to slidably receive the bucket connectors 260 therein with the flat sides 262 of the connectors bearing against the channel side walls 272. A ridge 274 is provided traversing the depth of the channel side walls 272 on each channel 268. The bucket 72 is installed by sliding the bucket into the housing 100 with the tapered entries 270 of the channels 268 facing the bucket connectors 260. When the bucket 72 is fully seated, the ridges 274 snap into the notches 264 in the bucket connectors. With this connection, as the bucket connectors rotate in conjunction with the bucket gears 252 and 254, the bucket 72 will also rotate about an axis extending through the bucket connectors. On the idler side of the bucket 72, the bucket gear 254 of the idler mechanism 240 will rotate as driven by rotation of the bucket 72. In turn, the bucket gear 254 will rotate the wheel 242 on the idler mechanism 240 and move the lift bar 220 to operate the lid. In this example, the wheels 242 reciprocate through a rotation angle of less then 180°.

The drive mechanism 216 employs a slip clutch assembly 275 as part of the bucket gear 252. As shown in FIGS. 7, 9, and 10A, the bucket gear 252 includes a serrated or toothed surface 276 surrounding an axle or shaft 278 of the gear. A drive gear 280 slips onto the end of the shaft 278 that is exposed on the exterior side of the bucket gear 252. The drive gear 280 includes a corresponding serrated surface 286 that mates with the serrated surface 276 on the bucket gear 252. A spring 282 is captured by a stop ring 284 received in a groove 285 on the end of the shaft 278 on the outside of the drive gear 280. The spring 282 applies pressure on the drive gear and hence between the serrated surfaces 276, 286 that engage one another between the gears 252, 280 on the same shaft 278. The slip clutch assembly 275 is created by serrated surfaces 276, 286, the spring 282, the stop 284, and the shaft 278.

The motor 218 includes an output shaft and pulley 290 in this example. A second pulley 292 is positioned adjacent the drive pulley 290. A rubber belt 294 connects the two pulleys. As the motor is rotated, the drive pulley 290 rotates the belt 294, which in turn drives the second pulley 292. The pulley 292 is carried on the outer end of a shaft 296, which also includes a small pinion gear 298 on the inner end of the shaft. The pinion gear 298 is coupled to a gear train which includes a plurality of gears 300, 302, and 304. Each of the gears in the gear train in this example is in the form of a spur gear. The gears 300, 302 each have a larger diameter disk 310 with teeth and a hub pinion gear 312 with teeth. Each gear 300, 302 is mounted on a shaft 314. The last gear 304 in the gear train includes a larger disk 310 with teeth and a pinion gear 316 on its shaft 314. The pinion gear 316 has a slightly larger diameter that the other pinions 312. This gear 316 engages the teeth 320 of the drive gear 280. The gear train operates as a step down motor to significantly reduce the input motor rotation speed to a much slower output speed.

In operation, if the sensor 134 senses an appropriate stimuli such as motion near its active interface 138, the sensor and circuit board 136 will function to run the motor 218. The motor will drive the pulley 290 and rotate the belt 294, which in turn drives the pulley 202 and the shaft 296. The pinion 298 on the shaft rotates the gear train 300, 302, 304. As a result, the drive gear 280 also rotates. The drive gear serrations 276 will cause the bucket gear 252 to rotate, which in turn will rotate the bucket gear 72 to the diaper receiving orientation via the bucket connector 260. The rotation of the bucket gear 252 also rotates the lid wheel 242, which in turn drives the lift bar 220 upward to raise the lid assembly 34. The circuit board 136 can be programmed to hold the lid assembly 34 in an open position for a desired period of time, such as five seconds. The system can be configured to then reverse rotation of the motor 218, which in turn reverses rotation of all the gears to lower the lid assembly 34 and to rotate the bucket 72 back to the dumping orientation with the diaper receptacle downward as shown in FIG. 4.

The lid wheel 242 on the drive mechanism side of the bucket has a switch contact pin 330 and a stop pin 331 that are carried on spokes of the wheel. The switch pin 330 is positioned to contact one of the switches 219 in one wheel rotation direction and the other of the switches 219 in the other direction. The stop pin 331 is similarly positioned to contact one of the stop bosses 354, 356 in one direction and the other of the stop bosses in the other direction. When the wheel rotates in one direction, the switch pin 330 contacts the appropriate switch 219 to stop the motor. The stop pin 331 contacts the appropriate stop boss 354, 356 to prevent over-rotation of the wheel and, thus, damage to the motor. When rotating in the other direction, the switch pin 330 contacts the other switch 219 to stop the motor and the stop pin 331 contacts the other one of the stop bosses 354, 356. The motor and circuit board are configured to drive the motor in the correct direction to raise the lid and then in the reverse direction to lower the lid in the present example. The idler wheel 242 only has a stop pin 331 for contacting travel limiters or stop bosses 354, 356 on the idler side of the bucket. As will be evident to those having ordinary skill in the art, the gear arrangement or other drive mechanism arrangement can be utilized and function in an entirely different manner and yet achieve the intended opening and closing function of the top opening 30 or access opening to the diaper pail.

If a user manually moves the lid, the lift bars will automatically rotate the lid wheels 242 which in turn automatically rotate the bucket gears 252 and 254. Thus, if the lid is actuated, the bucket 72 will rotate so it is always in the correct position in relation to the lid. The slip clutch assembly 275 is provided so that manual operation of the lid does not affect or damage the motor. The slip clutch assembly 275 is provided so that the motor does not rotate through manual movement of the lid. The motor can have a brake force greater than the force necessary to overcome the force of the spring 282 and serrated surfaces 276, 286 of the slip clutch assembly 275 in order to insure that the motor can move the lid and bucket but that manual actuation of the lid does not harm the motor.

Figure 11A:
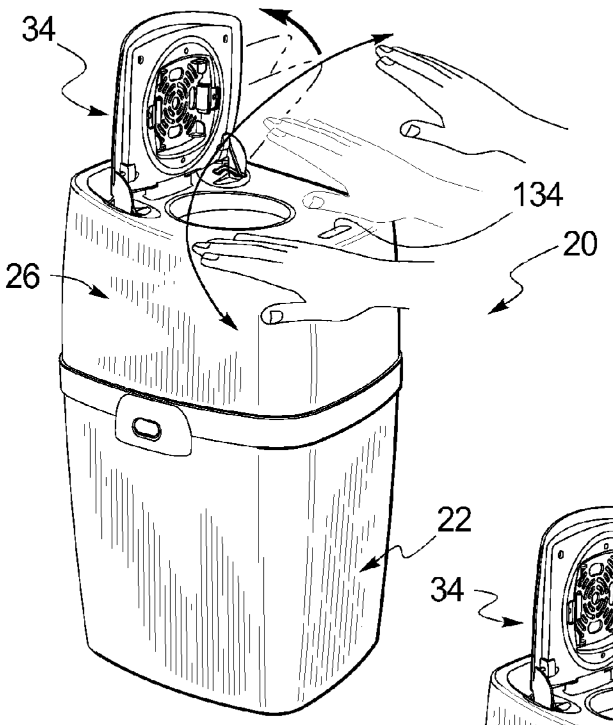
FIGS. 11A-11C show the steps for automatic touch-free operation of the diaper pail shown in FIG. 1.
Figure 11B:
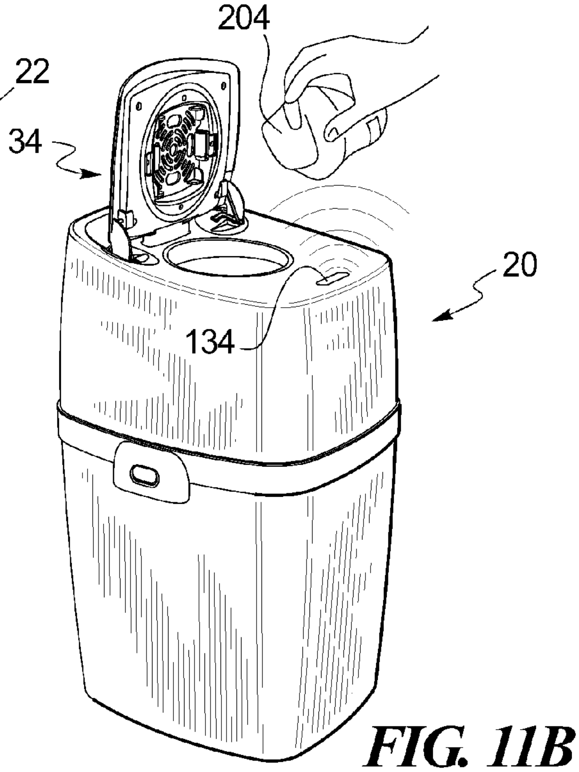
Figure 11C:
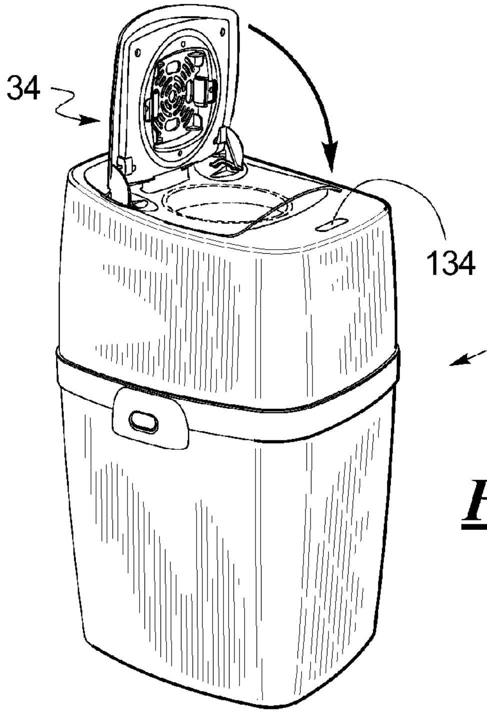

FIGS. 11A-11C illustrate automatic operation mode of the diaper pail 20 disclosed herein. As shown in FIG. 11A, a user need only swipe their hand or hold their hand within about six inches or less of the sensor to activate the diaper pail. The sensor will detect the hand stimulus and via the circuit board 136 signal the drive mechanism 216 to turn on and rotate the bucket 72, which simultaneously raises the lid 34 as shown The circuit board 136 can be programmed to retain the lid assembly 34 in an open position for as long as desired. In one example, the lid can stay open for about five seconds before automatically returning to a closed position. This gives the user five seconds to dispose of a diaper 204 through the top opening 30 in the top assembly as shown in FIG. 11B. The diaper 34 will drop into the bucket receptacle 200. After the predetermined pause interval, the lid will automatically return to the closed position by the drive mechanism. The circuit board 136 can be programmed to operate the motor in reverse to lower the lid to the closed position as shown in FIG. 11C. The sensor or limiter 219 will contact the pins 330 on the lid wheel 242 in this example to signal to the drive mechanism 216 and the circuit board 136 that opening or closing is complete to stop the drive mechanism. In order to operate the diaper pail disclosed herein in the automatic mode, the switch 214 must first be set to the automatic mode position.

Figure 12A:
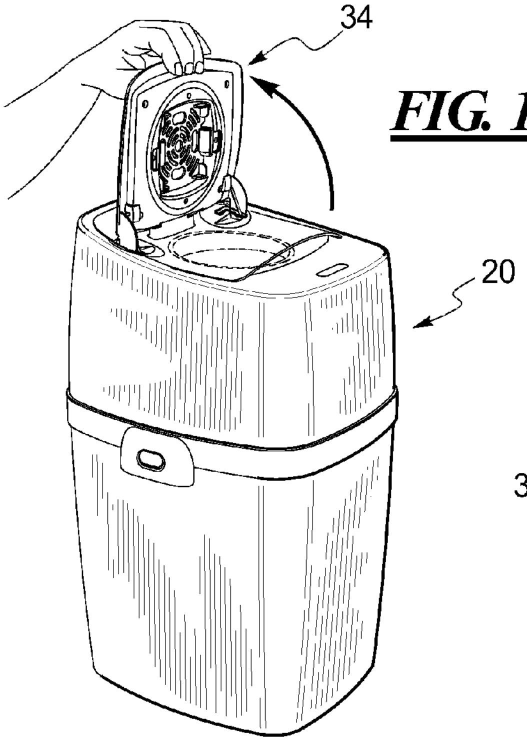
FIGS. 12A-12C show the steps for manual operation of the diaper pail shown in FIG. 1.
Figure 12B:
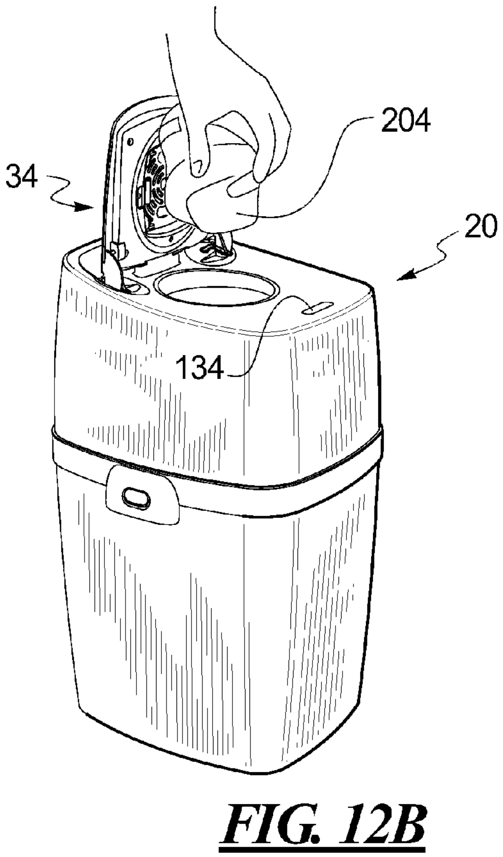
Figure 12C:
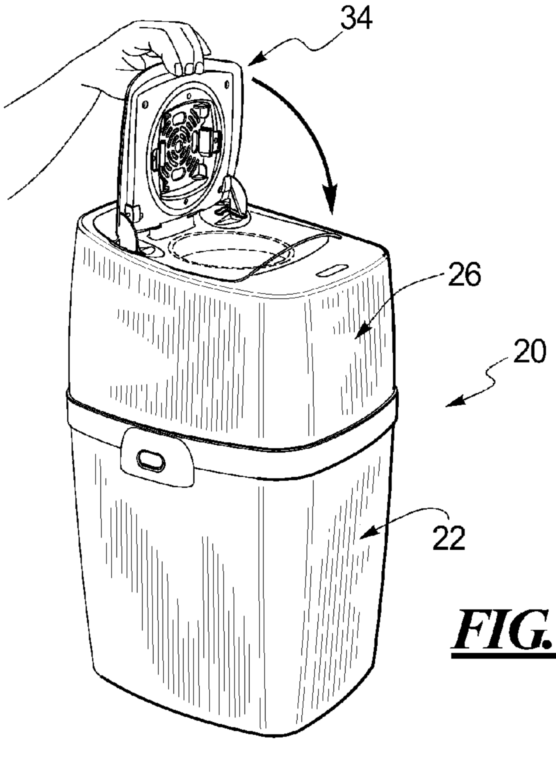

If a user wishes to operate the diaper pail manually, such as when the batteries are dead, there is no power to the pail, or the drive mechanism is malfunctioning, they can do so. In this example, the user will first set the switch 214 to the manual position, which will shut off power to the drive mechanism or otherwise prevent the drive mechanism from operating. As shown in FIG. 12A, a user simply grasps the front edge of the lid assembly 34 and raises the lid as shown. The lid wheel 242 and bucket gear 252 will automatically rotate the bucket 72 so that the bucket opening 202 is positioned upward adjacent the top opening 30 in the top assembly. The user can then drop a diaper 204 through the top opening 30 and the bucket opening 202 into the receptacle 200. The user then closes the lid manually as shown in FIG. 12C, which will rotate the bucket 72 back to the dumping orientation, exposing the bucket opening 202 to the bottom opening 112 of the bucket holder 108. The diaper 204 will then drop into the base container 22.

Prior to describing how to change the filter and a bag containing soiled diapers, we first describe additional seal functions of the disclosed diaper pail 20 and further detail of the cartridge cover 38. As best shown in FIGS. 5 and 6A, the cartridge cover 38 includes a perforate plate 400 with a plurality of perforations 402 to permit air or gas communication through the plate. A pair of flexible tabs 404 is provided on edges of the cover. Each of the tabs is essentially U-shaped with one part connected to the plate and another resilient part 406 spaced from the plate. Each of the parts 406 that is spaced from the plate is resilient and flexible and has a wedge-shaped detent 408 or catch on its exterior surface. A corresponding ridge projects from each of opposite sides of the cartridge housing 130 within the cartridge bay 70. The catches 408 snap over the ridges 410 to retain the cartridge cover 38 in place when installed over the cartridge bay 70 as shown in FIG. 6A. To remove the cartridge cover 38, a user simply presses the tabs 404 toward one another which releases the catches 408 from the ridges 410 and allows the cover to be pulled from the cartridge housing 130.

As best shown in FIGS. 7 and 8, a top surface of the base ring 24 includes an embedded gasket 420. The gasket can be relatively resilient and adhered to the material of the ring 24 in any suitable manner. The gasket can lie in a gasket recess within the ring top surface if desired. The gasket 420 in this example extends around the entire perimeter of a center opening 422 in the ring. Similarly, the bottom panel 111 of the housing 100 also has an opening into the interior of the housing. The bottom panel 111 surrounds that opening. In the disclosed example, a ridge 424 or bead projects downward from the bottom panel 111 of the housing and circumferentially surrounds the opening to the housing. As best shown in FIGS. 7 and 8, the ridge aligns with and rests on the gasket 420 when the top assembly 26 is installed on the container base 22. The ears 62 can be configured to engage the buttons 58 and drawn the top assembly downward so that the ridge or bead 424 presses tightly against the gasket 420.

Figure 13A:
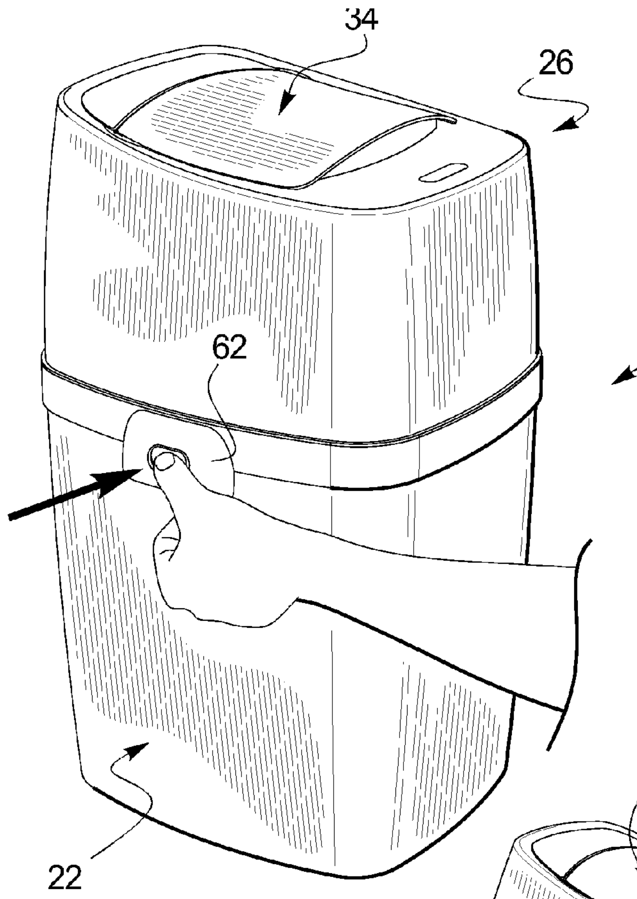
FIGS. 13A-13D show the steps for installing a standard trash bag used in the diaper pail shown in FIGS. 1-3.
Figure 13B:
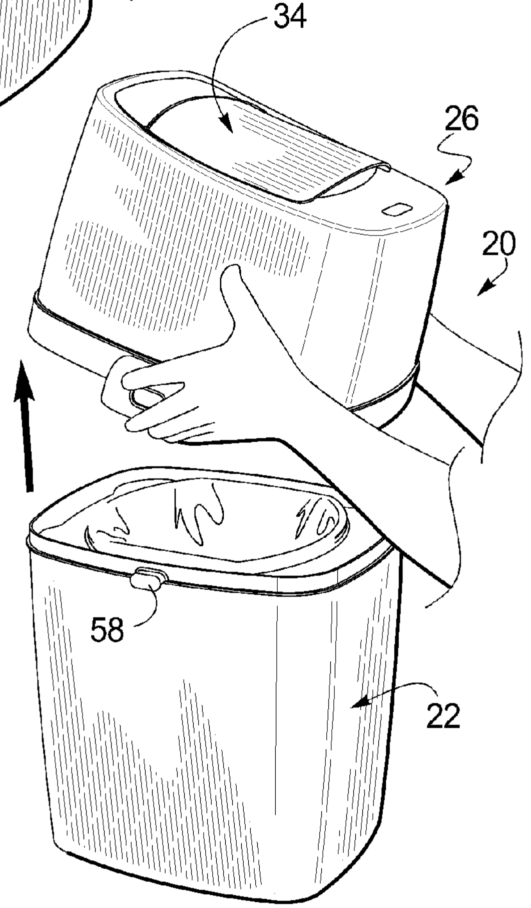
Figure 13C:
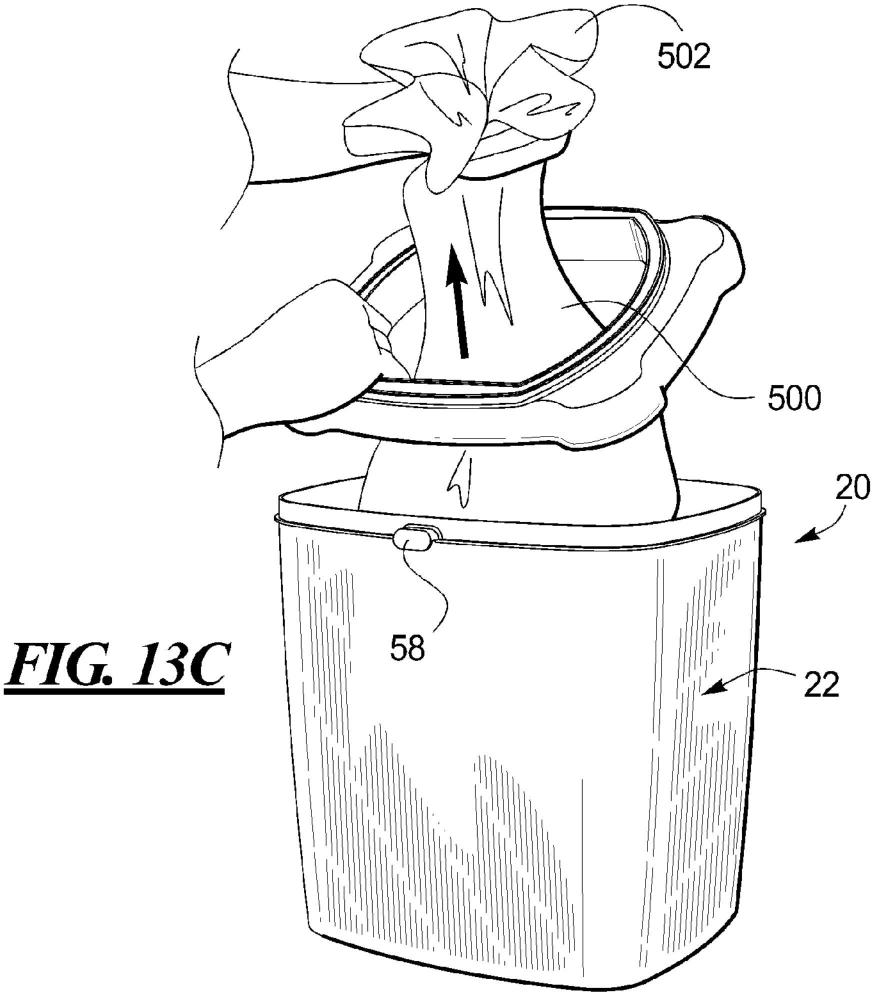
Figure 13D:
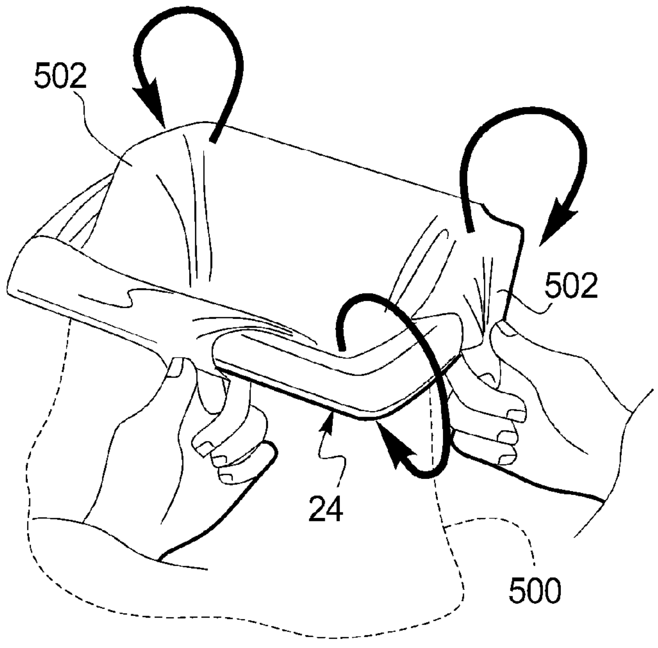

FIGS. 13A-13D demonstrate how one can change and replace a trash bag 500 stored in the container base 22 to collect diapers 204 (shown in FIGS. 11A-12D) during use of the diaper pail 20. As shown in FIG. 13A, a user simply grasps the ears 62 to release the button 58 from the button holes 64 in the ears as shown in FIG. 13A. This can be done in the manual mode to avoid the diaper pail functioning automatically. Thus, a user can set the switch 214 to the manual position. Once the ears are released, the user can lift the top assembly 26 from the container base 22 as shown in FIG. 13B. The user can then pull the top edge 502 of the bag 500 upward and then lift the ring 24 from the base 22 as shown in FIG. 13C to remove the filled bag. In order to properly install a new trash bag 500 in the container base 22, a user should first put the top edge 502 of the bag through the base ring 24 and then overlap the surfaces of the base ring with the top edges of the bag as shown in FIG. 13D. The ring can then be set on the container base 22 resting on the protrusions 44. The top edge of the bag 502 should overlap the top surface and gasket 420 of the ring 24. The top assembly 34 can then be replaced on the container base 22 in the reverse order of FIGS. 13-13D.

Figure 14:
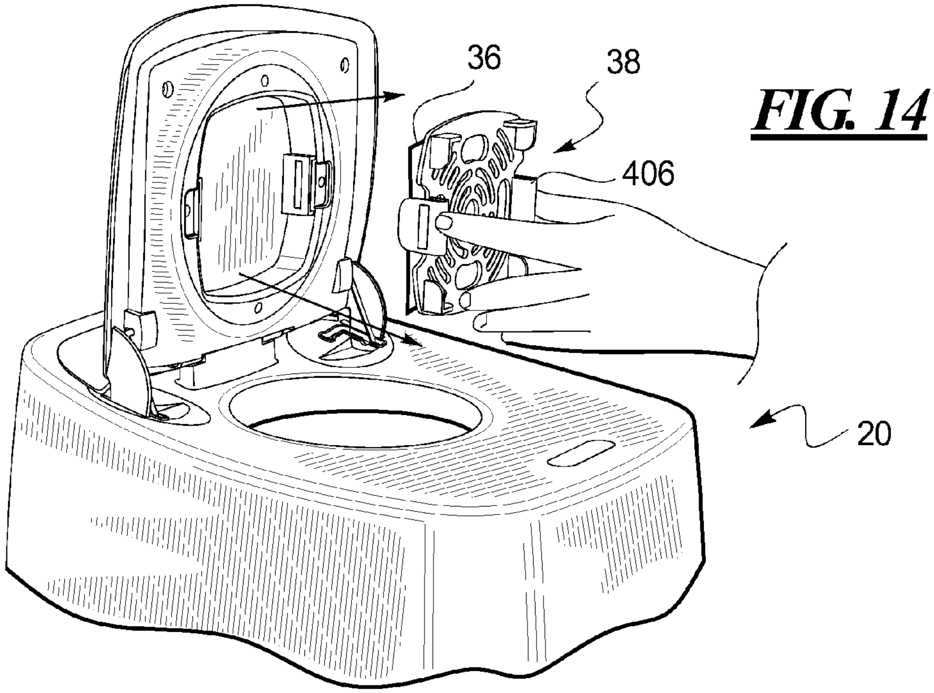
FIG. 14 shows the steps for removal and replacement of an odor-eating filter of the lid assembly for the diaper pail shown in FIGS. 1-3.

Replacement of the odor-eating filter 36 is very simple as shown in FIG. 14. A user simply grasps the flexible fingers or parts 406 of the tabs 404 of the cartridge cover 38 to release the cover from the cartridge housing 130. A spent cartridge or filter 36 can then be removed from the cartridge bay 70 in the lid assembly 34. A new cartridge or filter 36 can then simply be placed in the cartridge bay 70. The cartridge cover 38 can be snapped back into place over the new cartridge to complete the process.

Figure 15A:
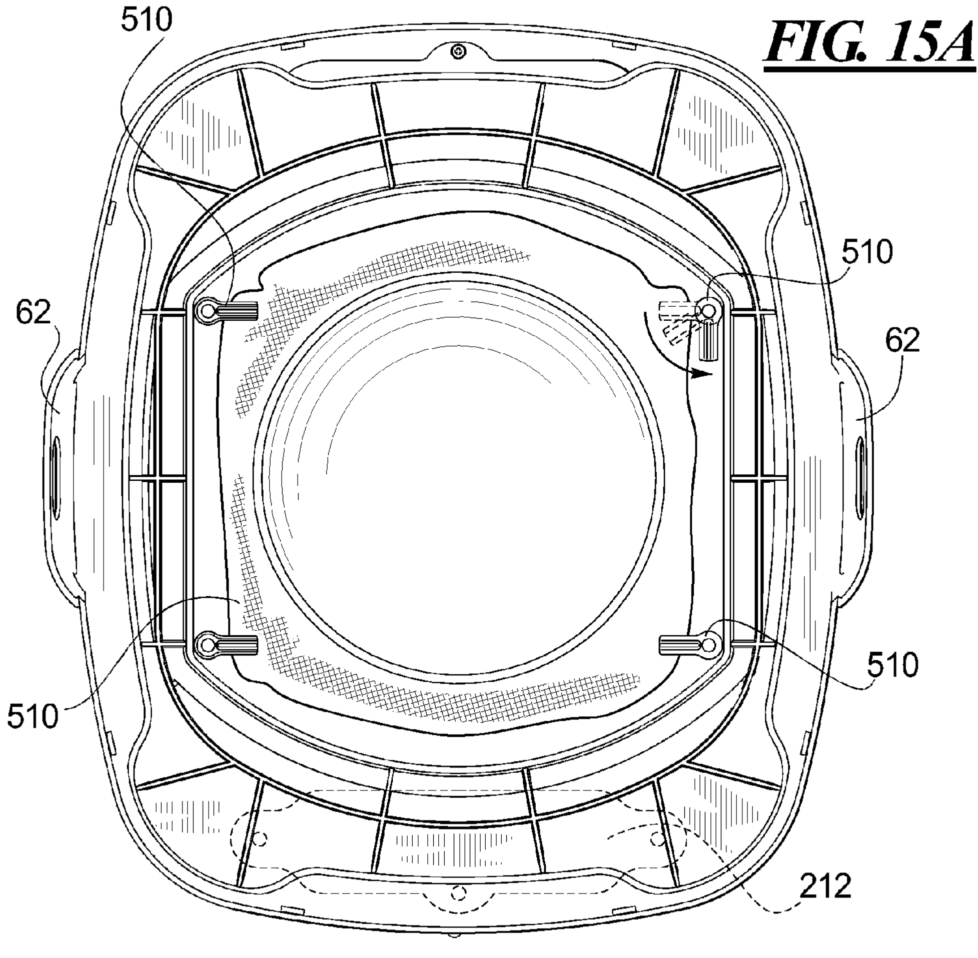
Figure 15B:
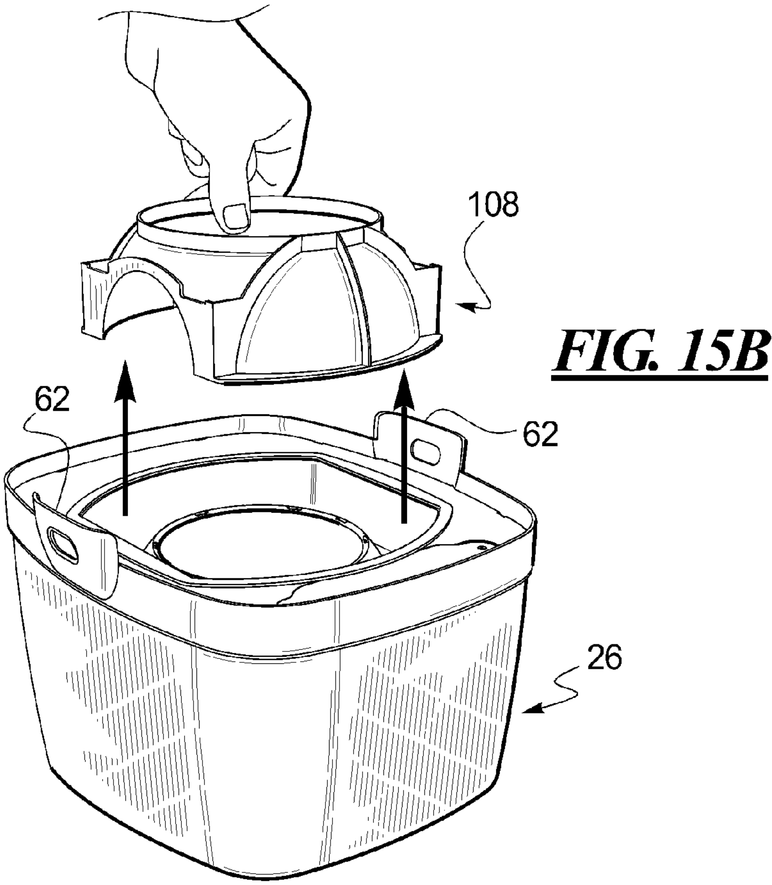
Figure 15C:
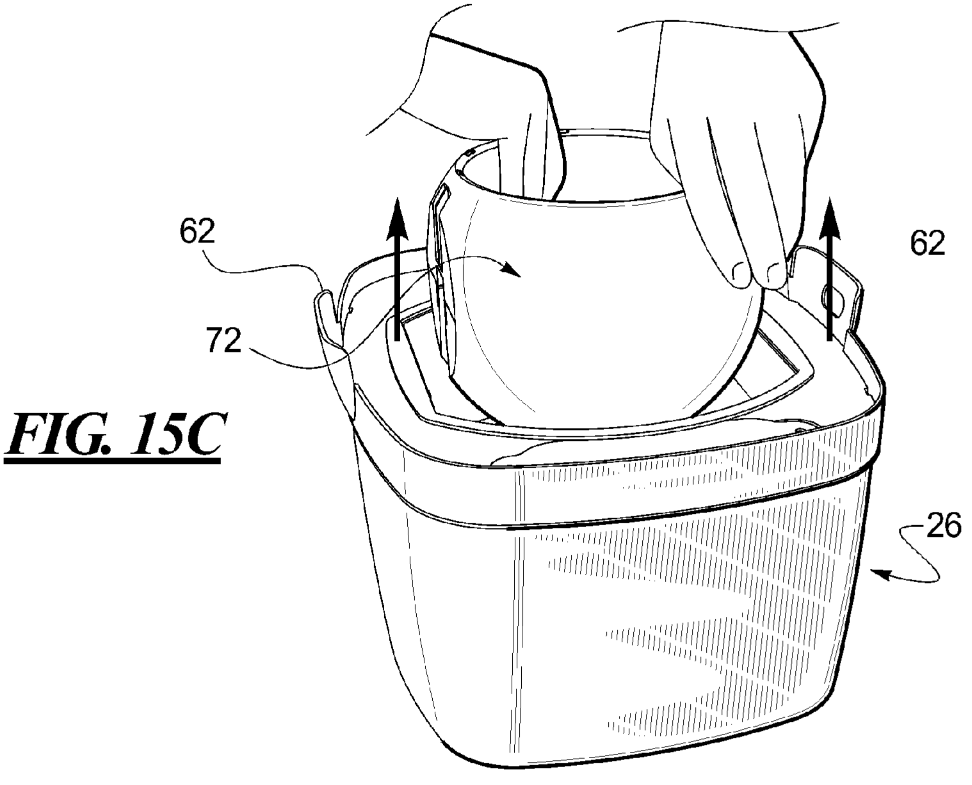

In the disclosed example, the bucket 72 can be easily and readily removed, cleaned, and replaced, as shown in FIGS. 15A-15D. Four rotatable catches 510 are mounted to a bottom panel of the top assembly housing 100. These catches can be rotated from a position capturing the bucket holder 108 in a position adjacent the dome receptacle 102 in the housing to a position as shown in FIG. 15A releasing the bucket holder. The bucket holder can then be lifted from the inverted top assembly 26 as shown in FIG. 15B. The bucket 72 can then easily be removed by simply snapping the bucket connectors 260 from within the channels 266 on the flat side portions 268 of the bucket 72. The bucket can then be lifted from the domed receptacle 102 in the top assembly as shown in FIGS. 15C and 15D.

As noted above, the bucket 72 can vary in configuration and construction and yet fall within the spirit and scope of the present invention. The bucket can take on other forms and yet provide a diaper receptacle and move between a position to receive diapers and a position to dump diapers into the container. Similarly, the top assembly 26 including the housing 100 can vary considerably within the scope of the present invention. The shape and contour of the various components and their interaction for assembly can vary from the embodiment shown. The exterior shell 28 can be shaped and contoured in many different ways and yet perform as intended according to the teachings of the present invention.

The disclosed top assembly 26 and the configuration of the bucket 72 and the housing 100 create a seal at virtually every connection point of the assembled diaper pail 20. In particular, the mating shape of the spherical bucket outer surface and the spherical housing interior surfaces combine to assist in preventing odor escaping the base container storage space through the bucket chamber. Additionally, operation of the bucket 72 in this example assists in substantially reducing odor escape when a diaper is being dropped into the device. The bucket 72 rotates but never completely opens an air flow path between the exterior of the diaper pail 20 and the interior storage space where the soiled diapers are stored. The bucket receptacle simply rotates from the receiving position facing upward to the dumping orientation facing downward. At no time is the interior of the housing open for odors to escape the storage space.

Additional seals are provided between the top surface of the top assembly and lid and between the top assembly and the gasket of the base ring. The top edge of the bag is pinched between the base ring gasket and the ridge under the bottom surface of the housing. These seals combined with the structure disclosed herein for the bucket create a diaper pail that allows only minimal odor to escape the diaper storage space. The dual chamber structure of the diaper pail results in an air containment system that minimizes escaping odors. The activated carbon air filter or charcoal filter substantially eliminates any odor that does escape during operation of the unit, during use of the unit, and when a new soiled diaper is initially installed in the up-turned diaper receptacle in the bucket.

The internal components of the diaper pail 20 can also vary considerably within the scope of the present invention. The particular aspects of the electronics and the drive mechanism can take on many forms and configurations and yet function as intended. In one example, the sensor can respond to any type of no-touch stimuli. For example, inductive or capacitance-type no touch devices can be incorporated into the disclosed diaper pail. Additionally, the system can utilize a light-based device that responds to ambient light changes. An infra red system could also be used, as well as a system utilizing a light beam, whether visible or invisible to the human eye, can also be utilized wherein blockage of a beam would activate or operate the device. An ultra sound system, a system that responds to change in air pressure or air movement, a system that employs a magnetic field, or radial frequency technology could also be employed. In another example, a remote control device can be employed in conjunction with a diaper pail constructed in accordance with the teachings of the present invention whereby a user can remotely operate the pail. In another example, a sound activated system could be employed, such as one that responds to a hand clap or even speech recognition. Additionally, the sensor can be digitally programmable and respond to voice commands if desired. In one example, such verbal commands can be programmed and saved by the user according to their particular needs and wishes.

In further examples, the disclosed diaper pail can alternatively be touch activated whereby a mechanical switch or button is employed that turns the device on and automatically operates the various components of the pail. For example, a mechanical switch or button can be provided on a surface of the diaper pail and be coupled to the mechanism of the device to operate the device once the button or switch is activated. A force sensor, such as a force sensing resistor or a piezoelectric device, could also be employed on an active surface or device. In a further example, a device employing touch capacitance technology could also be used with a touch-sensitive surface provided on the pail.

The drive mechanism that moves the bucket and the lid in the disclosed example can also vary from that shown. The particular gear arrangement and motor configuration can be varied considerably and yet operate to move the components of the diaper pail as needed. Similarly, the configuration and construction of the lid, including the manner in which it moves from a closed position to an open position can vary. The lid need not be pivotable, but instead can be configured to slide, twist, or otherwise move between an open and closed position. The mechanism employed to move the lid or other structure can also vary from the lift bars and lid wheels disclosed herein. Clearly, other mechanisms can be utilized to operate the disclosed lid or other such opening and closing device.

The lid can be eliminated altogether and be substituted with some other means for opening and closing an access opening into the diaper pail interior. For example, FIG. 16 shows another diaper pail 600 constructed in accordance with the teachings of the present invention. In this example, the diaper pail 600 can have a container base 602 and a top assembly 604 that rests on top of the container base. The top assembly 604 can include mechanisms (not shown) to rotate a bucket 606 with an open top 608 and a diaper receptacle 610. The bucket in this example also has a spherical outer surface 612 similar to the previously described bucket. A complimentary spherical housing 614 is also provided within the top assembly in this example. The housing 614 has an open top 616 and an open bottom 618. The receptacle 610 of the bucket 606 is configured to rotate 180° so that its opening 608 communicates with either the top opening 616 in a diaper receiving orientation as shown or with the bottom opening 618 facing a storage space 620 in the base in a dumping orientation. In this example, the diaper pail 600 does not have a top lid. Instead, the top opening 616 of the housing is always opened. A sensor 622 is placed adjacent the top opening 616 of the top assembly 604 in this example. The sensor is configured so that it detects motion passing through the top opening 616.

In this example, an odor seal is created at least in part by the complimentary spherical surfaces 612 and 614. A filter 36 can be placed on the interior of the diaper pail in this example such that it is in communication with the interior storage space 620 of the container base 602. To operate the device in this example, a user simply needs to drop a diaper 624 down through the always open top opening 616. The sensor 622 will detect the diaper as it passes down into the bucket receptacle 610. Upon sensing the diaper 624, the mechanisms that actuate the bucket 606 can rotate the bucket to the dumping orientation so that the bucket opening 608 is aligned with the bottom opening 618 in the housing. The diaper will drop into the storage space 620 in the container base 602. After a period of time, the bucket can automatically return to the receiving position shown in FIG. 16.

In an alternate example, the bucket 606 can be at normal rest in the dumping orientation to assist in providing a sealed storage space 620. The sensor 622 can be positioned so that a user merely needs to place the diaper near the sensor to cause the bucket to rotate to the receiving orientation of FIG. 16. The user can then drop the diaper 624 into the receptacle 610 to complete the disposal process. Upon dumping the diaper into the storage space, the bucket in this alternative example can remain in the dumping orientation until placement of another soiled diaper adjacent the sensor or upon other appropriate stimuli notifying the bucket to reorient to the receiving orientation.

The disclosed seals can also vary from the examples shown. The lid seal can take on different configurations and constructions and yet perform as intended to seal the diaper access opening when closed. The arrangement of the base ring 24, its seal or gasket 420, and the top assembly 26 can also vary within the spirit and scope of the present invention. The intent is to have a sealed and contained interior storage compartment for receiving the diapers. This can be accomplished with different seal arrangements than the disclosed examples. In this example, the spherical surface contact between bucket and housing parts can act as an additional odor seal, as can the top opening structure described above.

The manner in which the top assembly is attached to the container and engages the container can also vary within the spirit and scope of the present invention. Latches and structures can be employed to attach the top assembly to the base container, to align the two components when attached, and to hold or retain the top assembly on the container. Such latches and structures can differ from the disclosed examples of the ears, buttons, rim of the container, and skirt of the top assembly. The manner in which the two components engage can also vary.

A plurality of batteries 210 are disclosed for providing power to the diaper pail 20. However, other power sources can certainly be utilized. For example, a conventional AC power source can be relied upon to drive the mechanisms of the diaper pail. The batteries disclosed herein can be conventional disposable DC batteries or can be provided as part of a rechargeable battery pack. The diaper pail disclosed herein can also be provided to selectively operate on either AC power or DC power, depending upon the needs of a particular user.

The filter 36 disclosed herein can be an activated carbon air filter that utilizes charcoal paper treated with oxygen to open up millions of tiny pores between carbon atoms. These activated charcoals absorb odorous substances from gases. When the material absorbs an odorous substance, the substance attaches to the material by chemical attraction. The very large surface area of the activated charcoal gives it virtually countless bonding sites. When certain chemicals pass adjacent the carbon surface of the filter, the chemicals attach to the surface and are trapped. The activated charcoal filter disclosed herein can be configured to specifically attack and absorb odors emitted from soiled diapers. Thus, if any odor seeps past any of the gaskets or seals in the device from the storage container or anywhere beneath the lid, the activated charcoal filter will capture the molecules in the air that are producing the unpleasant odor. Thus, the disclosed diaper pail herein not only contains odor emitted from soiled diapers, it can eliminate the odors entirely.

The location and configuration of the disclosed filter 36 can also vary from the examples described herein. The filter need not be positioned directly on an underside of the lid. Instead, the filter can be placed on other surfaces of the interior of the container or top assembly and yet perform as intended. The manner in which the filter is retained in place and removed and replaced can also vary from the embodiment shown and described herein. The devices or structures used to hold the filter in place can vary from those of the disclosed removable cartridge cover. The number of filters can also vary from the single filter described in the disclosed example.

As noted above, the disclosed diaper pail can accommodate standard trash bags that are readily available at any grocery store, convenience store, or the like. The cost of a standard trash bag is significantly less than the cost of proprietary diaper storage bags that some units require. Further, standard trash bags cost significantly less than proprietary bags that are scented to mask soiled diaper odors. In one example, the disclosed diaper pail 20 can be configured for use with a conventional 13 gallon kitchen-sized plastic trash bag.

The disclosed diaper pail can be enhanced or further modified and yet fall within the spirit and scope of the present invention. In one example, the plastic components including the basic top assembly components and the base container components can be formed out of a resin-based material such as polypropylene (PP). The resin material can be embedded with antimicrobial technology. Antimicrobial content can be mixed in or built in to the resin base of the PP during the manufacturing process to become an intrinsic part of the diaper pail's inside surface. Using such material, microbes including bacteria, mold, mildew, odors, and other product deteriorate will come in contact with the surface of the plastic. Antimicrobial protection penetrates the cell wall of the microbe and disrupts key cell functions so that the microbe cannot function, grow, or reproduce. In another example, the resin-base material of the major diaper pail components can be embedded with a pleasant scent additive. The additive can be provided to help mask odor from soiled diapers, but without putting chemicals into the air like most air fresheners would do.

In a further example, the disclosed diaper pail can be customizable and manufactured to mate with an exterior ornamental sleeve. An assortment of sleeves can be provided with different decorative outer surfaces including colors, patterns, materials, images, or the like. A sleeve can be selected by a consumer and placed over the exterior of at least a portion of their diaper pail to suit their particular tastes. Such sleeves can be made out of plastic, wood, wicker, stainless steel, aluminum, cloth, or a combination of these and other materials. The sleeve can be configured to have a similar construction of at least the wall 42 of the disclosed container base 22 and be sized so that the base 22 can slip into the sleeve. Thus, the sleeve will be visible to individuals nearby.

In another example, the disclosed diaper pail can be modified to incorporate a temperature controlling device within the interior of the storage space. A device that can lower the temperature within the storage space can be employed, similar to a refrigerator or freezer. Reducing the temperature within the storage space can slow down microbe functionality and behavior and, thus, reduce the odor substance given off from soiled diapers stored in the reduced-temperature space. The temperature within the storage space can be maintained at a sufficiently low temperature, such as below freezing, to maintain the stored soiled diapers in a cryogenic state, which will result in the diapers giving off far less odor.

In another example, the diaper pail can be configured so that, prior to lifting the top assembly and removing the trash bag, the trash bag can be rotated one or more times at the top edge of the bag to significantly reduce the escaping odors upon bag removal. In one example, the base ring disclosed herein can be configured so that it is accessible from the exterior of the assembled diaper pail and rotatable in a manner that will twist the top edges of the bag sufficiently to close off the top of the bag prior to removal from the storage space. Upon removal or opening of the top assembly of the diaper pail, the bag will already be substantially closed and, thus, emit significantly less odor into the environment in which the diaper pail is placed.

In yet another example, the disclosed diaper pail can be provided with a device or system that notifies a user when the storage bag should be replaced. In one example, when the bag and the storage space are full of soiled diapers, a system or device can provide a signal or other alert to a user that it is time to change the bag. This may prevent a user from prematurely emptying the bag, thus, reducing waste. This will also assist in preventing the user from over-stuffing the diaper pail with soiled diapers. In one example, a so-called capacity sensor can be provided in the form of a light beam that is broken upon the soiled diapers reaching a certain vertical height or level with the storage space. Once the diapers reach a certain level, the light beam is broken and a light or other notification alter can be emitted to notify a user that it is time to change the bag. In another example, a capacity sensor can function like a conventional weight scale. A weight sensitivity system can be provided at a bottom of the base container 22. The device can sense the weight of the storage diapers within the storage space. Upon reaching a predetermined weight, an indicator light or other notifier can be emitted to signal a user that it is time to change the bag. In one example, a capacity sensor in the form of a scale can employ a pressure sensor or spring under a movable bottom panel.

Although certain diaper pail features and diaper disposal methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A diaper pail comprising:
- a base container with a bottom, an upstanding side wall, an open top, and an interior container space;
- a top assembly received over the open top of the base container and having a top opening in communication with the interior container space;
- a lid on the top assembly that can be operated to cover and to expose the diaper receiving opening;
- a bucket housed within the top assembly and having a diaper receptacle within the bucket and a diaper receiving opening that is open into the diaper receptacle, wherein the bucket moves between a receiving orientation and a dumping orientation upon operation of the lid;
- a drive mechanism for automatically operating the lid and the bucket; and
- an input device configured to notify the drive mechanism to automatically operate the lid and the bucket upon the input device receiving an appropriate input.

2. A diaper pail according to claim 1, wherein the input device is a manual switch or button that notifies the drive mechanism to operate the lid and the bucket when actuated by touch.

3. A diaper pail according to claim 1, wherein the input device is a touch-free sensor that notifies the drive mechanism to operate the lid and the bucket upon detecting an appropriate no-touch stimuli.

4. A diaper pail according to claim 1, wherein the diaper receiving opening is open to the top opening in the receiving orientation when the lid is operated to expose the top opening, and wherein the diaper receiving opening is open to the interior container space in the dumping orientation when the lid is operated to cover the top opening.

5. A diaper pail according to claim 4, wherein the lid can be optionally manually operated, and wherein the bucket automatically moves between the receiving orientation and the dumping orientation upon manual operation of the lid.

6. A diaper pail according to claim 1, further comprising:
- a filter in communication with the interior container space and designed to specifically eliminate by chemical reaction odor produced by soiled diapers.

7. A diaper pail according to claim 1, wherein the filter is an activated charcoal filter carried on an underside of the lid.

8. A diaper pail according to claim 1, further comprising:
- a switch on the diaper pail that can be selectively set to an automatic mode that activates the input device and the drive mechanism to operate the lid automatically and to a manual mode that deactivates the input device and permits the lid to be operated manually.

9. A diaper pail according to claim 1, further comprising:
- a base ring that sets within the top opening of the container base and that has a center opening;
- a gasket on the base ring surrounding the center opening;
- a bottom panel of the top assembly and having a component opening into an interior hollow of the top assembly;
- a ridge surrounding the component opening and configured to match the contour of the gasket on the base ring; and
- a trash bag positioned within the interior container space and having an opening in an upper end of the trash bag, wherein the upper end overlies the base ring and is captured between the seat ridge and the base ring gasket.

10. A diaper pail according to claim 1, further comprising:
- a compression seal that is compressed between the lid and the top surface of the top assembly surrounding the top opening when the lid covers the top opening.

11. A diaper pail comprising:
- a body having an interior container space;
- an access opening into the interior container space;
- a diaper receptacle in the body and having a diaper receiving opening into the receptacle;
- an obstruction that can be moved between a receiving orientation and a dumping orientation; and
- an input device configured to signal a part of the diaper pail to automatically operate the obstruction between the dumping orientation and the receiving orientation to receive a soiled diaper into the diaper receptacle and to dump the soiled diaper from the diaper receptacle into the interior container space.

12. A diaper pail according to claim 11, wherein the input device is a manual device that notifies the part of the diaper pail to automatically operate the obstruction when the manual device is actuated by touch.

13. A diaper pail according to claim 11, wherein the input device is a touch-free sensor that can detect an appropriate no-touch stimuli and then signal the part of the diaper pail to automatically operate the obstruction to receive a soiled diaper and then to dump the soiled diaper.

14. A diaper pail according to claim 13, wherein the touch-free sensor is a motion sensor.

15. A diaper pail according to claim 11, wherein the interior container space is a confined and sealed space when the access opening is closed.

16. A diaper pail according to claim 11, wherein the interior container space is sized to accept a standard size trash bag.

17. A diaper pail according to claim 11, wherein the obstruction comprises:
- a lid that is automatically operable to expose and cover the diaper receiving opening.

18. A diaper pail according to claim 17, wherein the obstruction also includes a rotatable bucket forming the diaper receptacle.

19. A diaper pail according to claim 11, further comprising:
- an activated charcoal filter in communication with the interior container space and designed to chemically eliminate odors that emanate from soiled diapers.

20. A diaper pail comprising:
- a body having an interior container space for storing soiled diapers;
- an access opening into the interior container space;
- a diaper receptacle in the body and having a diaper receiving opening into the receptacle to receive the soiled diapers;
- an obstruction that can be moved between a receiving orientation to receive a soiled diaper in the diaper receptacle and a dumping orientation to dump the soiled diaper; and an activated charcoal filter in communication with at least the interior storage space and designed to chemically eliminate odors that emanate from the soiled diapers in the interior storage space.

21. A diaper pail according to claim 20, further comprising:

a touch-free sensor on the diaper pail configured to detect an appropriate stimuli and to signal a part of the diaper pail to automatically move the obstruction for a sufficient time to receive the soiled diaper and then to automatically dump the soiled diaper.

22. A diaper pail according to claim 20, further comprising:

a movable lid covering an access opening in the body and that can be operated to expose the access opening to receive the soiled diaper; and a touch-free motion sensor on the diaper pail configured to detect an appropriate motion stimuli and to signal a part of the diaper pail to automatically open the lid for a sufficient time to place the soiled diaper in the access opening and into the diaper receptacle and then to automatically close to lid.

23. A diaper pail according to claim 22, further comprising:

a drive mechanism configured to automatically pivotally rotate the lid open and closed and move the diaper receptacle when operated according to the motion stimuli; and an on-board power source electrically coupled to the drive mechanism and the touch-free sensor.

24. A diaper pail according to claim 20, wherein the obstruction further comprises:

a rotatable bucket housed within the diaper pail and forming the diaper receiving opening and the diaper receptacle, wherein the bucket is oriented with the diaper receiving opening adjacent an access opening in the body in the receiving orientation and with the diaper receiving opening adjacent the storage space in the dumping orientation; and a drive mechanism configured to rotate the bucket between the receiving orientation and the dumping orientation.

25. A diaper pail according to claim 24, further comprising:

a lid covering the access opening and movable to expose the access opening; and a touch free sensor on the body and configured to automatically move the lid and the bucket according to a no-touch sensed stimuli.

26. A diaper pail according to claim 20, further comprising:

an input device configured to signal a part of the diaper pail to automatically operate the obstruction between the dumping orientation and the receiving orientation to receive a soiled diaper into the diaper receptacle and to dump the soiled diaper from the diaper receptacle into the interior container space.

* * * * *